(12) United States Patent
Patil et al.

(10) Patent No.: US 10,907,858 B2
(45) Date of Patent: Feb. 2, 2021

(54) CONCENTRIC SHAFT ACTUATION MECHANISM

(71) Applicant: Air Distribution Technologies IP, LLC, Milwaukee, WI (US)

(72) Inventors: Vikas A. Patil, Jaysingpur (IN); A K S Manian, Chennai (IN); Parmeshwar G. Patil, Pune (IN); Rajesh D. Vyas, Vadodara (IN); Atul A. Shitkande, Pune (IN); Kapil D. Sahu, Pune (IN)

(73) Assignee: Air Distribution Technologies IP, LLC, Milwaukee, WI (US)

(*) Notice: Subject to any disclaimer, the term of this patent is extended or adjusted under 35 U.S.C. 154(b) by 219 days.

(21) Appl. No.: 16/121,440

(22) Filed: Sep. 4, 2018

(65) Prior Publication Data
US 2020/0072493 A1    Mar. 5, 2020

Related U.S. Application Data

(60) Provisional application No. 62/724,517, filed on Aug. 29, 2018.

(51) Int. Cl.
| | | |
|---|---|---|
| *F24F 13/14* | (2006.01) | |
| *F16D 11/14* | (2006.01) | |
| *F16D 21/06* | (2006.01) | |
| *F16D 23/12* | (2006.01) | |
| *F16H 19/00* | (2006.01) | |
| *F24F 13/15* | (2006.01) | |

(52) U.S. Cl.
CPC .......... *F24F 13/1426* (2013.01); *F16D 11/14* (2013.01); *F16D 21/06* (2013.01);
(Continued)

(58) Field of Classification Search
CPC .............. F24F 13/1426; F24F 13/1413; F24F 13/1486; F24F 13/15; F24F 2013/1433; F24F 2013/1473; F24F 2013/1446; F16D 11/14; F16D 21/06; F16D 23/12; F16D 2023/123; F16H 19/001; F16H 1/06; F16H 27/08; F25D 17/045; F16K 31/53; F16K 31/04–055
(Continued)

(56) References Cited

U.S. PATENT DOCUMENTS

| | | | | |
|---|---|---|---|---|
| 2,462,182 A | * | 2/1949 | Guerdan | H02K 23/60 310/115 |
| 4,031,951 A | * | 6/1977 | Engler | F24F 1/01 165/103 |

(Continued)

*Primary Examiner* — Jessica Cahill
(74) *Attorney, Agent, or Firm* — Fletcher Yoder, P.C.

(57) ABSTRACT

The present disclosure relates to a power transmission system for actuating a damper. The power transmission system includes an input shaft configured to rotate about a first axis and a first input dog rotatably coupled to the input shaft. The power transmission system also includes a second input dog coupled to the first input dog. The first input dog includes a first arrangement of teeth extending along a second axis and the second input dog includes a second arrangement of teeth extending along the second axis. The first input dog and the second input dog are configured to move axially along the second axis to enable engagement and disengagement of the first and second input dogs with first and second output dogs, respectively. The first and second output dogs are configured to engage with respective damper blades of the damper.

30 Claims, 17 Drawing Sheets

(52) U.S. Cl.
CPC ........... *F16D 23/12* (2013.01); *F16H 19/001* (2013.01); *F24F 13/1413* (2013.01); *F16D 2023/123* (2013.01); *F24F 13/1486* (2013.01); *F24F 13/15* (2013.01); *F24F 2013/1433* (2013.01); *F24F 2013/1473* (2013.01)

(58) Field of Classification Search
USPC ..... 251/248, 250.5, 298; 137/601.08–601.17
See application file for complete search history.

(56) References Cited

U.S. PATENT DOCUMENTS

| | | | | |
|---|---|---|---|---|
| 4,223,832 | A * | 9/1980 | Gorchev | F24F 13/1406 236/49.5 |
| 4,749,004 | A * | 6/1988 | Peash | B64D 13/00 137/865 |
| 5,334,095 | A | 8/1994 | Colling et al. | |
| 5,717,264 | A * | 2/1998 | Hadano | D01H 1/244 310/75 D |
| 5,765,592 | A * | 6/1998 | Karlicek | F16K 1/165 137/601.06 |
| 7,967,669 | B2 | 6/2011 | Baik | |
| 10,030,882 | B2 * | 7/2018 | Karamanos | G05D 7/0676 |
| 10,175,669 | B2 * | 1/2019 | Karamanos | G05D 7/0635 |
| 2001/0027814 | A1 * | 10/2001 | Stone | F24F 13/10 137/601.12 |
| 2013/0068846 | A1 | 3/2013 | Bluestone | |
| 2015/0019022 | A1 * | 1/2015 | Karamanos | G05D 7/0647 700/276 |
| 2016/0341439 | A1 * | 11/2016 | Karamanos | G05D 7/0635 |
| 2017/0045283 | A1 * | 2/2017 | Saito | F25D 17/08 |
| 2017/0276013 | A1 * | 9/2017 | Suciu | F16H 49/001 |

\* cited by examiner

CONCENTRIC SHAFT ACTUATION MECHANISM

CROSS REFERENCE TO RELATED APPLICATIONS

This application claims priority from and the benefit of U.S. Provisional Application Ser. No. 62/724,517, entitled "CONCENTRIC SHAFT ACTUATION MECHANISM," filed Aug. 29, 2018, which is hereby incorporated by reference in its entirety for all purposes.

BACKGROUND

This disclosure relates generally to heating, ventilation, and air conditioning (HVAC) systems. Specifically, the present disclosure relates to an actuation mechanism for a damper assembly.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A heating, ventilation, and/or air conditioning (HVAC) system may be used to thermally regulate an environment, such as a building, home, or other structure. The HVAC system generally includes a vapor compression system having heat exchangers, such as a condenser and an evaporator, and a compressor that is configured to circulate a refrigerant through a refrigerant loop having the heat exchangers. A system of ductwork is typically used as an air distribution system to direct a flow of air across the heat exchangers, and thus, enable the heat exchangers to transfer thermal energy between the refrigerant and the air. In many cases, a damper and a fan are fluidly coupled to the ductwork, which cooperate to modulate a flow rate of the air within the ductwork. An actuator is typically coupled to a blade of the damper, such that the actuator may adjust a position of the damper.

SUMMARY

The present disclosure relates to a power transmission system for actuating a damper. The power transmission system includes an input shaft configured to rotate about a first axis and a first input dog having a first arrangement of teeth extending along a second axis generally parallel to the first axis. The first input dog is rotatably coupled to the input shaft such that rotation of the input shaft imparts rotation to the first input dog about the second axis. The power transmission system also includes a second input dog having a second arrangement of teeth extending along the second axis, where the second input dog is coupled to the first input dog such that rotation of the first input dog imparts rotation to the second input dog about the second axis. The first arrangement of teeth is positioned concentrically inward relative to the second arrangement of teeth, and the first input dog and the second input dog are configured to move axially along the second axis relative to one another to enable independent engagement and disengagement of the first and second input dogs with first and second output dogs, respectively. The first and second output dogs are configured to engage with respective damper blades of the damper.

The present disclosure also relates to a power transmission system for actuating a damper. The power transmission system includes an input shaft configured to rotate about a first axis and an idler shaft rotatably coupled to the input shaft such that rotation of the input shaft imparts rotation to the idler shaft, where the idler shaft extends along and is configured to rotate about a second axis. The power transmission system also includes a first input dog disposed concentrically within a second input dog, where the first and second input dogs are coupled to the idler shaft, configured to rotate with the idler shaft and, configured to move axially along the second axis relative to the idler shaft and each other. The power transmission system further includes a first output dog disposed concentrically within a second output dog, where the first and second output dogs are configured to rotate about the second axis. Axial movement of the first input dog relative to the idler shaft enables engagement and disengagement between the first input dog and the first output dog.

The present disclosure also relates to a heating, ventilation, and/or air conditioning (HVAC) system including a flow modulation device having a pair of concentric damper blades, where each damper blade of the pair of concentric damper blades is coupled to a respective one of a pair of concentric shafts configured to rotate about a first axis. The HVAC system also includes a power transmission system having first and second output dogs extending along the first axis, where the first and second output dogs are respectively coupled to a shaft of the pair of concentric shafts. The HVAC system further includes an actuator coupled to and configured to rotate an input shaft of the power transmission system about a second axis, where the input shaft engages with first and second input dogs configured to rotate about the first axis such that rotation of the input shaft about the second axis imparts rotation to the first and second input dogs about the first axis. The first and second input dogs are configured to translate axially along the first axis, such that axial translation of the first input dog enables engagement with and actuatable rotational motion of the first output dog with respect to the second output dog.

BRIEF DESCRIPTION OF THE DRAWINGS

Various aspects of this disclosure may be better understood upon reading the following detailed description and upon reference to the drawings in which:

FIG. 14A is a detailed view of FIG. 14 taken along line 14A, in accordance with an aspect of the present disclosure;

DETAILED DESCRIPTION

Figure 1:
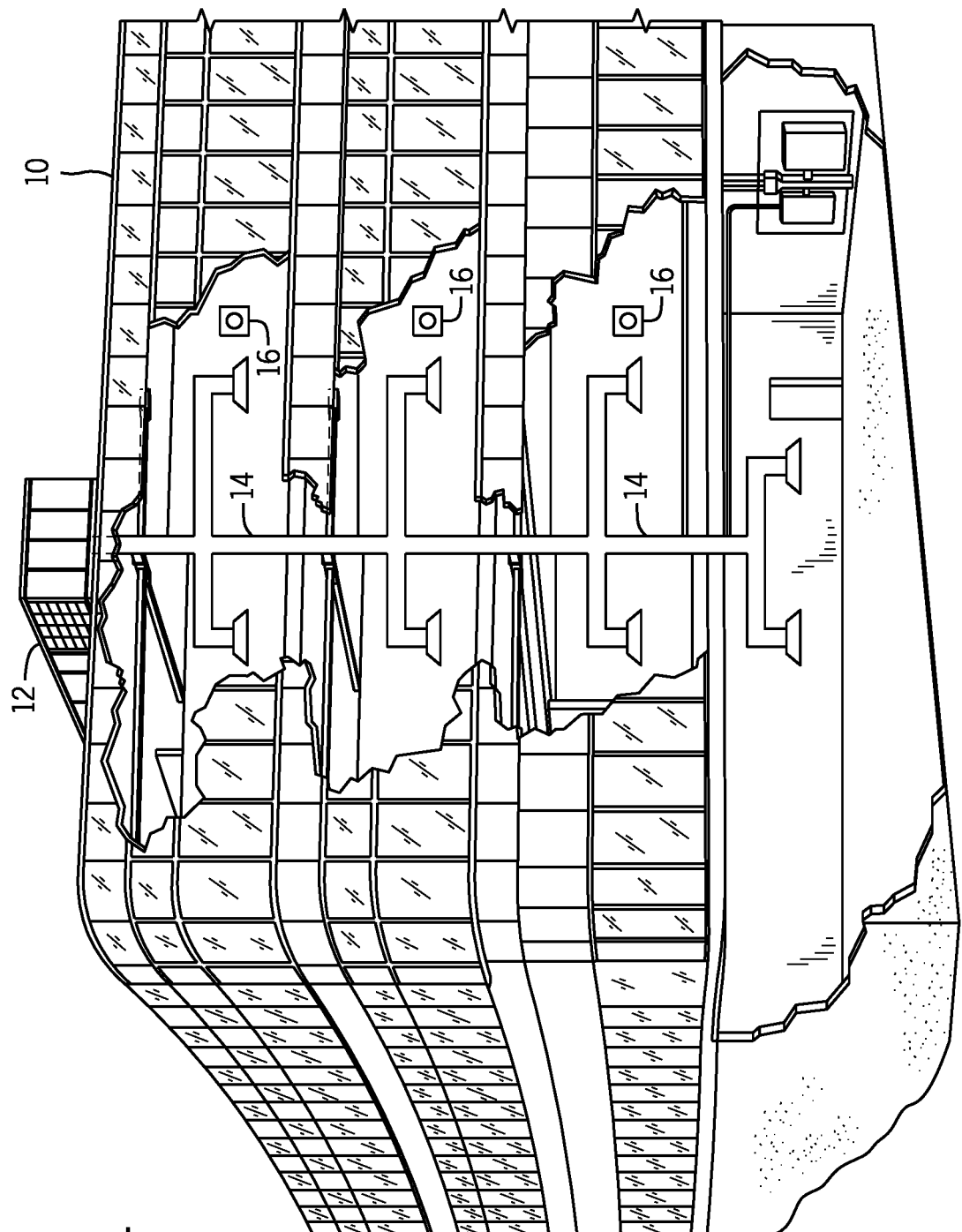
FIG. 1 is a perspective view of an embodiment of a building that may utilize a heating, ventilation, and/or air conditioning (HVAC) system and associated air distribution system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that traditional actuators may not be suitable to operate dampers including multiple blades, such as a split-blade damper that includes a pair of concentric blades disposed within a damper housing. For example, typical actuators generally include a single output shaft, and thus, may only modulate one blade of the pair of concentric blades. Accordingly, conventional actuators may operate the split-blade dampers ineffectively which, in some cases, reduces an operational efficiency of the HVAC system.

As mentioned above, a heating, ventilation, and/or air conditioning (HVAC) system may include ductwork, or a system of ductwork, which operates as an air distribution system and defines a flow path of air extending between various components of the HVAC system, such as a condenser and an evaporator. Accordingly, refrigerant within the condenser and the evaporator may exchange thermal energy with the air, and thus, condition the flow of air. In certain cases, a fan may be disposed within the ductwork and operate to facilitate the flow of air throughout the ductwork. Dampers may also be included within the ductwork, which may be used to modulate a flow rate of the air by adjusting an effective cross-sectional area of the flow path. For example, in certain cases, the dampers may each include a split-blade damper, which includes a pair of concentric damper blades disposed within a damper housing. Each of the blades is configured to transition between a fully open position and a fully closed position and, as such, modulate an effective cross-sectional area of the flow path. Accordingly, increasing or decreasing the effective cross-sectional area of the flow path increases or decreases, respectively, a flow rate of air through the damper.

In some cases, each of the concentric blades is coupled to a respective one of a pair of concentric shafts protruding from the damper housing. Accordingly, the pair of concentric shafts may be used to individually modulate a position of the concentric blades of the split-blade damper. Unfortunately, conventional actuators typically include a single output shaft, and thus, are unable to separately couple to and control both of the shafts of the pair of concentric shafts. These existing actuators may therefore only control one blade of the pair of concentric damper blades, thereby requiring additional actuators to control all of the damper blades. As such, conventional actuators may be inadequate to effectively operate the split-blade dampers.

It is presently recognized that using separate actuators to control each of the concentric damper blades may increase assembly and maintenance costs of the split-blade damper assembly. Moreover, certain dampers may be disposed within tight spatial constraints, such that the use of multiple actuators is not viable. As such, it is recognized that it is desirable to individually modulate a position of each of the blades of the split-blade damper using a single actuator. Furthermore, it is also recognized that using one actuator to control the split-blade damper may facilitate calibration of the damper, because synchronization of multiple actuators may not be performed. Accordingly, it is presently recognized that an improved damper control mechanism is desired.

With the foregoing in mind, embodiments of the present disclosure are directed to a power transmission system, referred to herein as a gearbox mechanism, that is configured to enable an actuator having a single output shaft to individually modulate a position of each blade of the concentric blades of the split-blade damper. For example, the gearbox mechanism includes an input shaft that is configured to couple to the output shaft of the actuator, and thus, enable the transfer of rotational motion from the actuator to the gearbox mechanism. The input shaft is rotatably coupled to an idler shaft via a pair of gears. A concentric pair of input dogs is coupled to the idler shaft and configured to translate axially along the idler shaft. As described in greater detail herein, the gearbox mechanism may include an actuation mechanism, which may induce selective axial translations of each of the input dogs relative to the idler shaft. For example, the actuation mechanism may axially translate each of the input dogs in response to rotational motion of the input shaft.

Each of the input dogs includes a set of axially protruding teeth, which are configured to engage with a respective set of axially protruding teeth of a pair of concentric output dogs. The output dogs are disposed collinearly with the idler shaft and are rotatably coupled to an enclosure of the gearbox mechanism. Thus, a position of the output dogs relative to the idler shaft remains substantially fixed. Axial translations of the input dogs with respect to the idler shaft may thus enable each of the input dogs to selectively engage, or selectively disengage with a respective one of the output dogs. Engagement between an input dog and a respective output dog may enable the transfer of rotational motion from the input shaft to the respective output dog of the gearbox mechanism. Conversely, rotational motion from the input shaft may not be transmitted to a particular output dog when a respective input dog is disengaged from the particular output dog. As such, coordinated axial translations of the input dogs relative to the idler shaft may enable the individual modulation of a rotational position of the output dogs. Each of the output dogs may couple to a respective shaft of the pair of concentric shafts of the split-blade damper assembly. Accordingly, the gearbox mechanism may enable a single actuator to individually control a position of each of the blades of the split-blade damper. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system that includes an outdoor HVAC unit and an indoor HVAC unit.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

It should be appreciated that any of the features described herein may be incorporated with the HVAC unit 12, a residential heating and cooling system, a rooftop unit, or any other suitable HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 2:
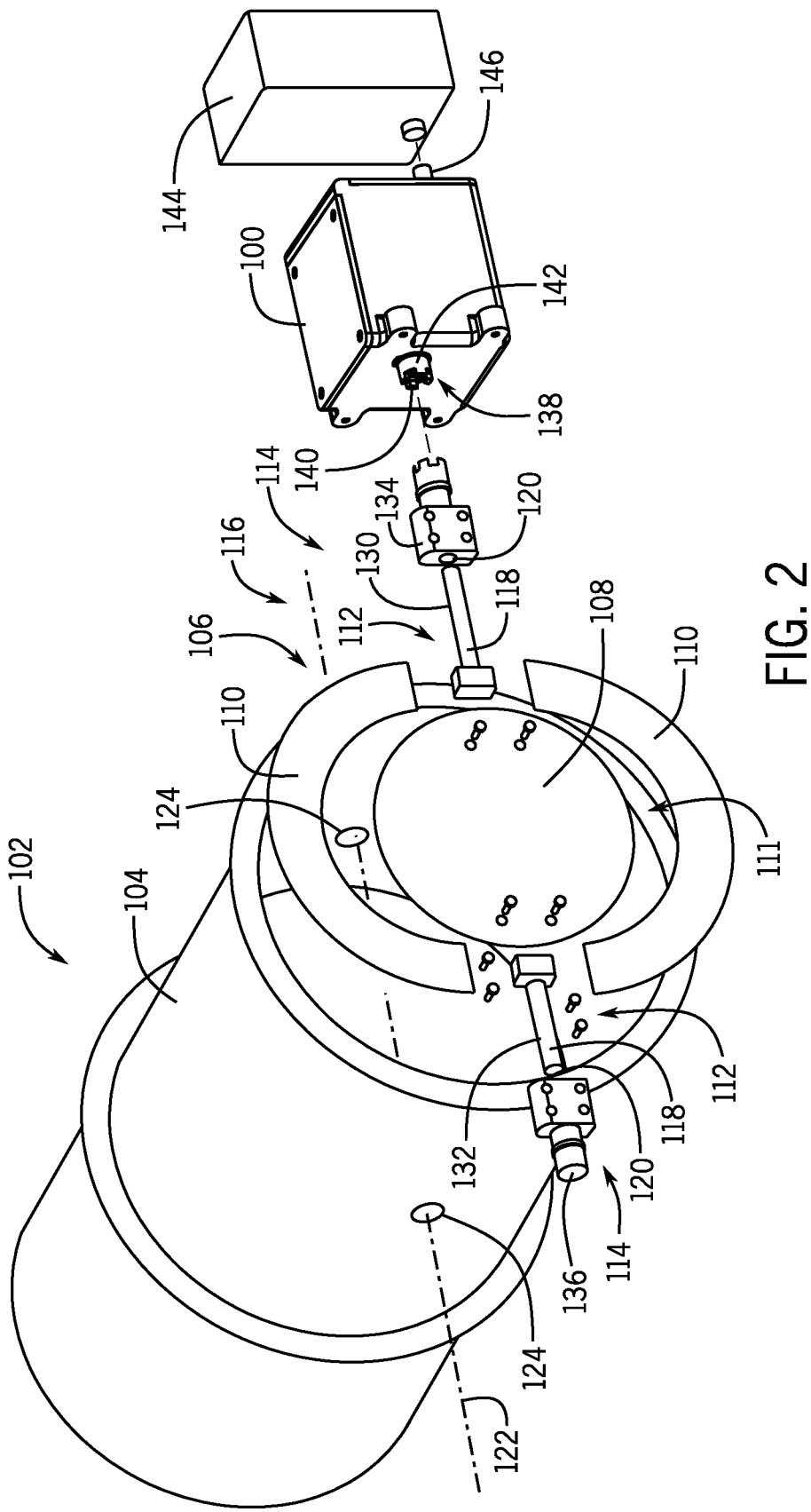
FIG. 2 is a perspective view of an embodiment of a flow modulation device including a gearbox mechanism, in accordance with an aspect of the present disclosure.

With the foregoing in mind, FIG. 2 is a perspective view of an embodiment of a gearbox mechanism 100, or a power transmission system, which may be used to actuate a flow modulation device 102, such as a split-blade damper. The flow modulation device 102 may be coupled to the ductwork 14 of the HVAC unit 12, ductwork of a residential heating and cooling system, or any other suitable ductwork and/or conduit. The flow modulation device 102 includes a housing 104 having a damper assembly 106 disposed therein, which is configured to modulate a flow rate of fluid, such as air, flowing through the housing 104. The damper assembly 106 includes an inner blade 108, or a first blade, and an outer blade 110, or a second blade, that are disposed concentric to one another within the housing 104. In other words, the inner blade 108 is disposed within an aperture 111 of the outer blade 110. The inner blade 108 and the outer blade 110 are coupled to inner blade holders 112 and outer blade holders 114, respectively, which collectively from a shaft assembly 116. Each of the inner blade holders 112 includes a shaft 118 that is configured to extend through a respective opening 120 disposed within each of the outer blade holders 114. Accordingly, the openings 120 enable the inner blade holders 112 to rotate independent of the outer blade holders 114, such that rotation of the inner blade holders 112 drives rotation of the inner blade 108 and rotation of the outer blade holders 114 drives rotation of the outer blade 110. The shaft assembly 116 is disposed collinear to a centerline 122, which extends through apertures 124 disposed within diametrically opposite sides of the housing 104. The outer blade holders 114 are rotatably coupled to the apertures 124 using, for example, bushings, bearings, or the like. This configuration may substantially block axial movement of the shaft assembly 116, while still enabling each of the inner and outer blades 108, 110 of the damper assembly 106 to rotate within the housing 104 during operation of the flow modulation device 102.

In some embodiments, the inner blade holders 112 include an active inner blade holder 130 and a passive inner blade holder 132 that is disposed opposite the active inner blade holder 130. Similarly, the outer blade holders 114 may include an active outer blade holder 134 and a passive outer blade holder 136 disposed opposite the active outer blade holder 134. The active inner blade holder 130 and the active outer blade holder 134 are each coupled to a respective one of a concentric pair of couplings 138, referred to herein as a pair of output dogs 138, which extend from the gearbox mechanism 100. In other words, a first coupling 140, or a first output dog 140, may couple to the active inner blade holder 130 while a second coupling 142, or a second output dog 142, may couple to the active outer blade holder 134. As described in greater detail herein, the gearbox mechanism 100 is configured to individually control rotation of the first output dog 140 and the second output dog 142 through an internal gearing assembly. As such, the gearbox mechanism 100 may control a first position of the inner blade 108 through rotational motion of the first output dog 140, and may separately control a second position of the outer blade 110 through rotational motion of the second output dog 142. The gearbox mechanism 100 may thus enable the individual transitioning of the inner and outer blades 108, 110 between a respective open position and a respective closed position. Accordingly, the damper assembly 106 may modulate a cross-sectional area of the housing 104 through which air may flow, and thus, modulate a flow rate of air flowing through the housing 104.

In some embodiments, the gearbox mechanism 100 is coupled to an actuator 144, such as an external actuator, which is configured to rotate an input shaft 146 extending from a portion of the gearbox mechanism 100. The input shaft 146 supplies rotational mechanical energy to the gearing assembly disposed within the gearbox mechanism 100. The gearing assembly is configured to convert the rotational mechanical energy supplied from the single input shaft 146 into separately actuatable rotational motion of the pair of output dogs 138. In other words, the gearing assembly enables input power transferred to the input shaft 146 from the actuator 144 to be split between, and separately output to the first output dog 140 and the second output dog 142. The features of the gearing assembly discussed in detail herein thus enable a single actuator, such as the actuator 144, to individually modulate a position of both the inner and outer blades 108, 110 of the flow modulation device 102.

It should be noted that the gearbox mechanism 100 has been shown as coupled to the flow modulation device 102 by way of example only, and is not limited to use with the flow modulation device 102. One of skill in the art would appreciate that the gearbox mechanism 100 may be coupled to any suitable device that may be controlled using rotational motion from a concentric pair of shafts, such as the pair of output dogs 138. For example, the gearbox mechanism 100 may be used to control operation of a butterfly valve, a locking mechanism, a gate system, or any other suitable device.

Figure 3:
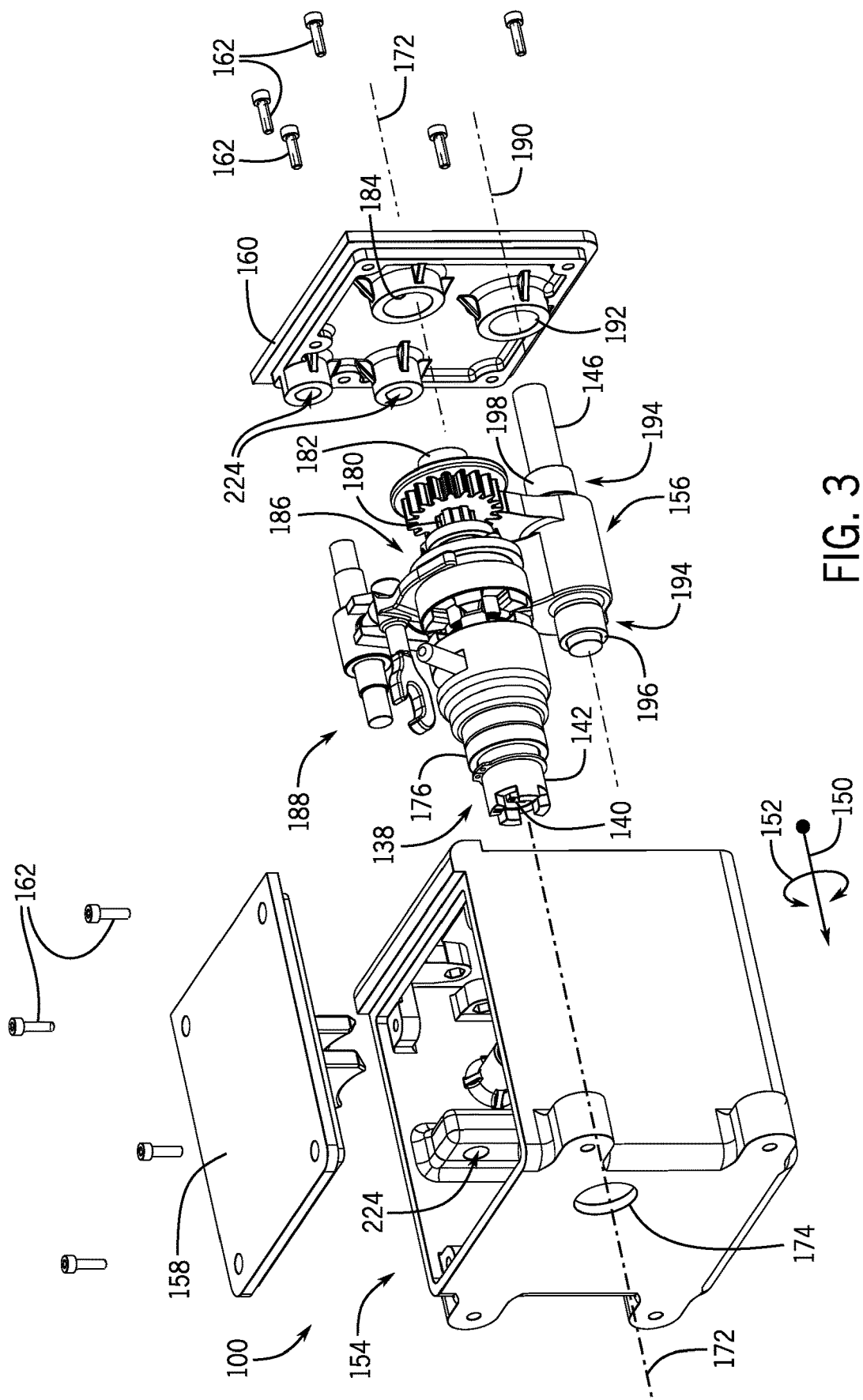
FIG. 3 is an exploded perspective view of an embodiment of the gearbox mechanism of FIG. 2, in accordance with an aspect of the present disclosure.

FIG. 3 is an exploded view of an embodiment of the gearbox mechanism 100. To facilitate discussion, the gearbox mechanism 100 and its components will be described with reference to a lateral axis or direction 150 and a rotational direction 152 about the lateral axis 150. The gearbox mechanism 100 includes an enclosure 154, which houses a gearing assembly 156 that is configured to enable the individually actuatable rotational motion of the output dogs 138. The enclosure 154 may be constructed of aluminum, steel, polymer materials, or any other suitable material that can be manufactured to include structural features of the enclosure 154 discussed herein. In some embodiments, the enclosure 154 may include removable panels, such as a top cap 158 and an end plate 160, which may be coupled to the enclosure 154 via fasteners 162. Additionally or otherwise, the top cap 158 and the end plate 160 may be coupled to the enclosure 154 using adhesives such as welds, bonding glue, magnetic strips, or a combination thereof. The top cap 158 and the end plate 160 may enable access to the gearing assembly 156, and thus, facilitate assembly and maintenance of the gearbox mechanism 100. However, it should be noted that in other embodiments, the enclosure 154 may include additional or fewer removable panels than those shown in FIG. 3.

As shown in the illustrated embodiment of FIG. 3, the output dogs 138 are positioned along a first centerline 172 or axis, which is also a center line of an aperture 174 extending through the enclosure 154. A bearing 176 may be disposed about the second output dog 142 and enable the second output dog 142 to rotate while being positioned within the aperture 174. Accordingly, the bearing 176 enables the first and second output dogs 140, 142 to rotate about the first centerline 172, while substantially blocking axial movement (such as along the lateral direction 150) of the first and second output dogs 140, 142 relative to the enclosure 154 of the gearbox mechanism 100. It should be noted that in certain embodiments, the bearing 176 may be omitted from the gearing assembly 156, such that the second output dog 142 interfaces directly with a circumference of the aperture 174. In such embodiments, a lubricant, such as oil, grease, or the like, may be used to reduce frictional effects between the second output dog 142 and the aperture 174, as the second output dog 142 rotates about the first centerline 172.

The gearing assembly 156 further includes an idler shaft 180 that is positioned along the first centerline 172. Similar to the second output dog 142, the idler shaft 180 may include a bearing 182 that is configured to facilitate rotation of the idler shaft 180 when disposed in a second aperture 184 of the end plate 160 of the enclosure 154. As such, the idler shaft 180 may rotate about the first centerline 172, while being substantially blocked from axial movement (such as along the lateral direction 150) relative to the enclosure 154. A pair of concentric input dogs 186 is coupled to the idler shaft 180 and configured to translate axially along the idler shaft 180, or with respect to the idler shaft 180. In other words, each of the input dogs 186 is configured to move along the lateral axis 150. As described in greater detail herein, axial movement of the input dogs 186 may enable each of the input dogs 186 to selectively engage, or selectively disengage with a respective one of the output dogs 138. The gearing assembly 156 further includes an actuation mechanism 188, which is configured to facilitate the axial translation of the input dogs 186 relative to the idler shaft 180.

The input shaft 146 is positioned along a second centerline 190 or axis, which defines a third aperture 192 extending through the end plate 160 of the enclosure 154. The input shaft 146 may include a pair of bearings 194, which are configured to facilitate rotation of the input shaft 146 when positioned in the thirst aperture 192 of the enclosure 154. In particular, a first bearing 196 of the pair of bearings 194 may facilitate rotation of the input shaft 146 to a mounting block within the enclosure 154, while a second bearing 198 of the pair of bearings 194 facilitates rotation of the input shaft 146 when the input shaft 146 is positioned within the third aperture 192. Accordingly, the pair of bearings 194 may enable the input shaft 146 to rotate about the second centerline 190 while substantially blocking axial movement of the input shaft 146 relative to the enclosure 154 of the gearbox mechanism 100.

Figure 4:
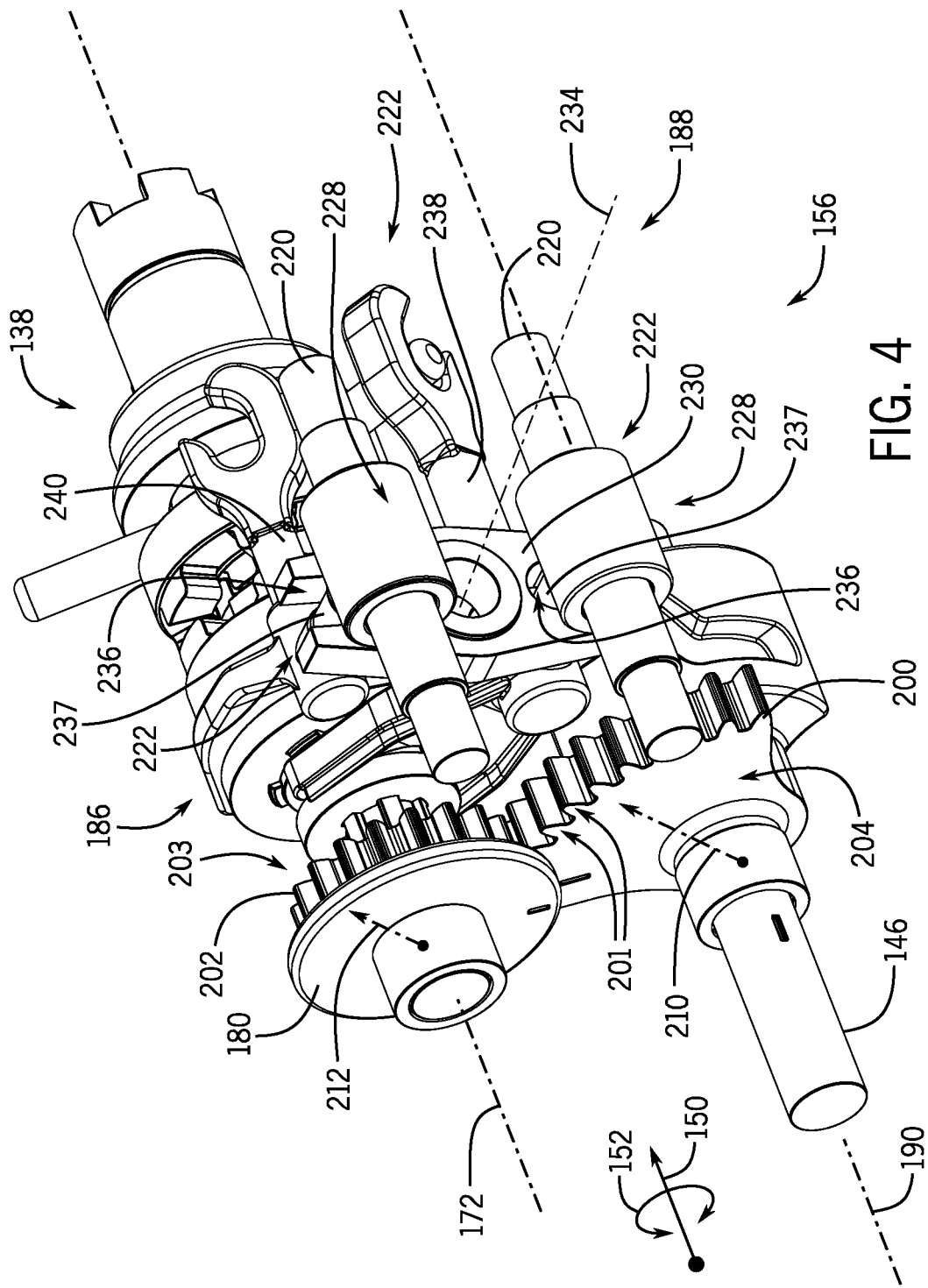
FIG. 4 is a perspective view of an embodiment of a gearing assembly disposed within the gearbox mechanism, in accordance with an aspect of the present disclosure.

FIG. 4 is a perspective view of the gearing assembly 156 that may be disposed within the enclosure 154. The input shaft 146 includes an input gear 200 that is configured to engage with an idler gear 202 of the idler shaft 180. In other words, teeth 201 of the input gear 200 mesh with corresponding teeth 203 of the idler gear 202, such that rotation of the input gear 200 drives rotation of the idler gear 202. The input gear 200 and the idler gear 202 thus enable the transfer of rotational motion between the input shaft 146 and the idler shaft 180 of the gearing assembly 156. Specifically, rotational motion of the input shaft 146 about the second centerline 190 may induce rotational motion of the idler shaft 180 about the first centerline 172.

In some embodiments, the input gear 200 may include a non-circular gear, such as a partial gear or an asymmetrical gear. In such embodiments, a portion 204 of the input gear 200 may be proportional to a predetermined degree of rotation of the input shaft 146. This predetermined degree of rotation may be indicative of a stroke cycle generated by the actuator 144 during operation of the gearbox mechanism 100. For example, the actuator 144 may be configured to rotate the input shaft 146 in accordance with a stroke cycle that may extend between zero degrees and ninety degrees of rotation or, in other words, one quarter of a revolution. In such an embodiment, the portion 204 of the input gear 200 may be approximately equal to, or marginally greater than, one quarter of a complete circular gear. Accordingly, a quantity of the teeth 201 disposed on the input gear 200 may be reduced, such that the input gear 200 includes only the teeth 201 that engage with the teeth 203 of the idler gear 202 that is consistent with the stroke cycle of the actuator 144.

In other embodiments, the actuator 144 may be configured to generate a stroke cycle between zero degrees and sixty degrees, zero degrees and 180 degrees, zero degrees and 270 degrees, or zero degrees and 360 degrees. In such embodiments, the portion 204 of the input gear 200 may be approximately equal to, or marginally greater than one sixth of a complete circular gear, one half of a complete circular gear, three quarters of a complete circular gear, or a full circular gear, respectively. In further embodiments, the portion 204 may include any suitable portion of a circular gear configured to maintain engagement between the teeth 201 and the teeth 203 during operation of the gearing assembly 156. Similarly, the idler gear 202 may also include a non-circular gear or partial gear, a configuration of which may be determined similar to that of the input gear 200 discussed above.

In certain embodiments, a first radial dimension 210, or a first radius, of the input gear 200 may be greater than a second radial dimension 212, or a second radius, of the idler gear 202. The thereby resulting gear ratio between the input gear 200 and the idler gear 202 functions as an overdrive, such that a lesser degree of rotation of the input gear 200 generates a larger degree of rotation of the idler gear 202. In such an embodiment, a relatively small angle of rotation applied by the actuator 144 to the input shaft 146 may generate a relatively large angle of rotation of the idler shaft 180. As a non-limiting example, the gear ratio between the input gear 200 and the idler gear 202 may be 1:2, 1:3, 1:4, or any other suitable gearing ratio. It should be noted that in other embodiments, the first radial dimension 210 of the input gear 200 may be substantially equal to the second radial dimension 212 of the idler gear 202. In still further embodiments, the first radial dimension 210 of the input gear 200 may be less than a second radial dimension 212 of the idler gear 202.

As noted above, the gearbox mechanism 100 includes the actuation mechanism 188, which is disposed within the enclosure 154 and positioned adjacent to the gearing assembly 156. The actuation mechanism 188 includes a pair of guide rods 220 that fixedly couple to mounting holes 224, as shown in FIG. 3, of the enclosure 154. The mounting holes 224 may substantially block the guide rods 220 from axial movement or rotational motion relative to the enclosure 154 and the gearing assembly 156. The actuation mechanism 188 also includes a pair of axial actuators 222 which, as discussed in greater detail herein, are configured to axially translate each of the input dogs 186 along the lateral axis 150. The axial actuators 222 each include a sleeve 228 that is configured to engage with a respective one of the guide rods 220. The sleeves 228 enable the axial actuators 222 to translate axially along the lateral axis 150 while substantially blocking other directional motion of the axial actuators 222.

The actuation mechanism 188 further includes a reversing member 230 that extends between each of the axial actuators 222. The reversing member 230 is rotatably coupled to a stud disposed within the enclosure 154, which enables the reversing member 230 to rotate about a third centerline 234 or axis. Slots 236 disposed within the reversing member 230 are configured to engage with respective shaft portions 237 of the axial actuators 222, such that the reversing member 230 may operate as a pivot configured to transfer axial movement between a first actuator 238 and a second actuator 240 of the pair of axial actuators 222. As described in greater detail herein, the reversing member 230 thus enables the pair of axial actuators 222 to synchronously move the input dogs 186 between respective engaged and disengaged positions.

Figure 5:
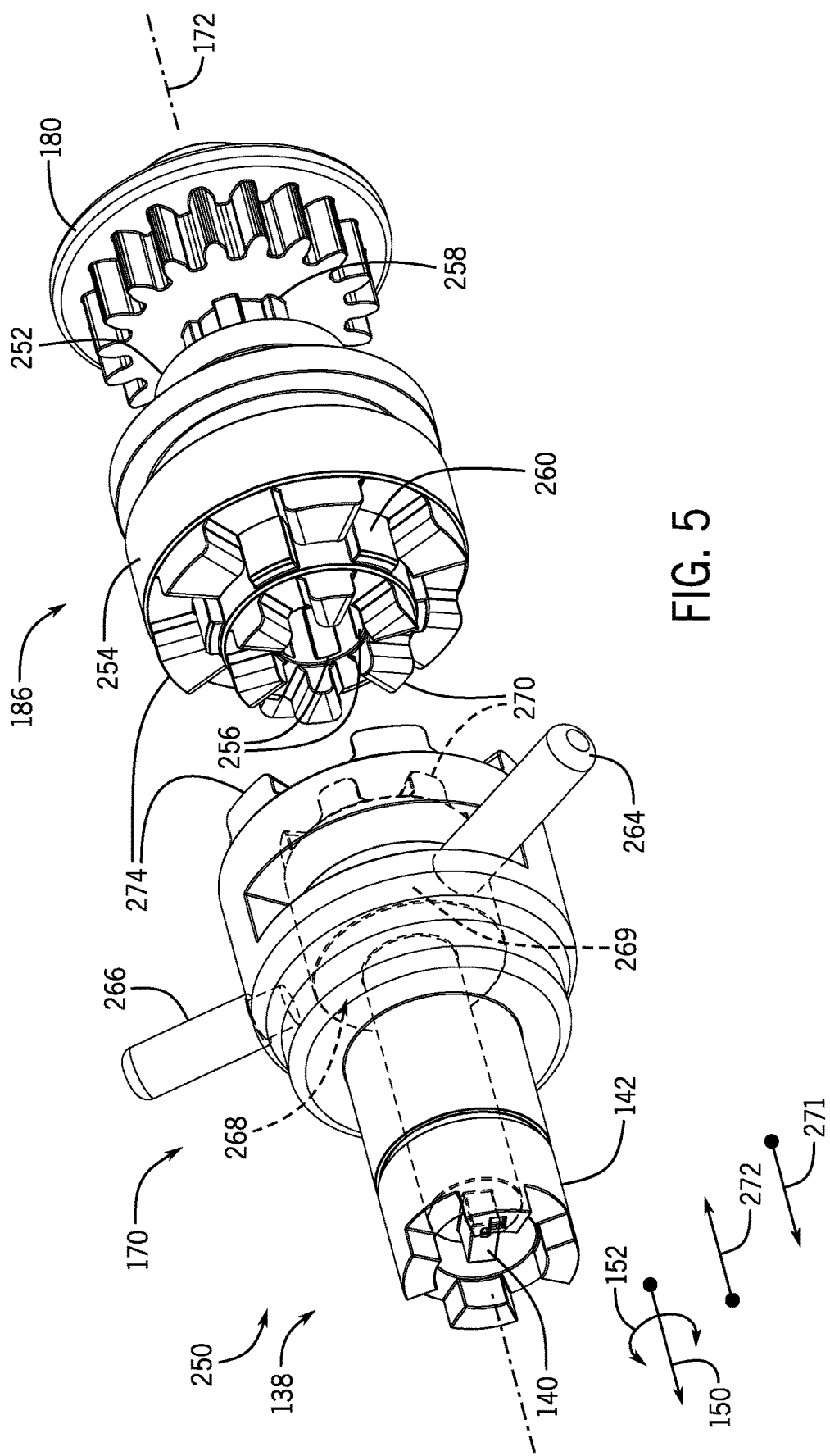
FIG. 5 is a perspective view of an embodiment of a shaft assembly that may be included in the gearing assembly, in accordance with an aspect of the present disclosure.

FIG. 5 is an embodiment of a shaft assembly 250 of the gearing assembly 156, which includes the output dogs 138, the input dogs 186, and the idler shaft 180. The input dogs 186 include an inner input dog 252, or a first input dog 252, and an outer input dog 254, or a second input dog 254. The first input dog 252 includes internal grooves 256 disposed about an inner circumference of the first input dog 252, which are configured to engage with splines 258 disposed about an outer circumference of the idler shaft 180. The internal grooves 256 and the spines 258 allow the first input dog 252 to slide axially along the idler shaft 180, parallel to the lateral direction 150, while still enabling the idler shaft 180 to transfer rotational motion to the first input dog 252.

Figure 17:
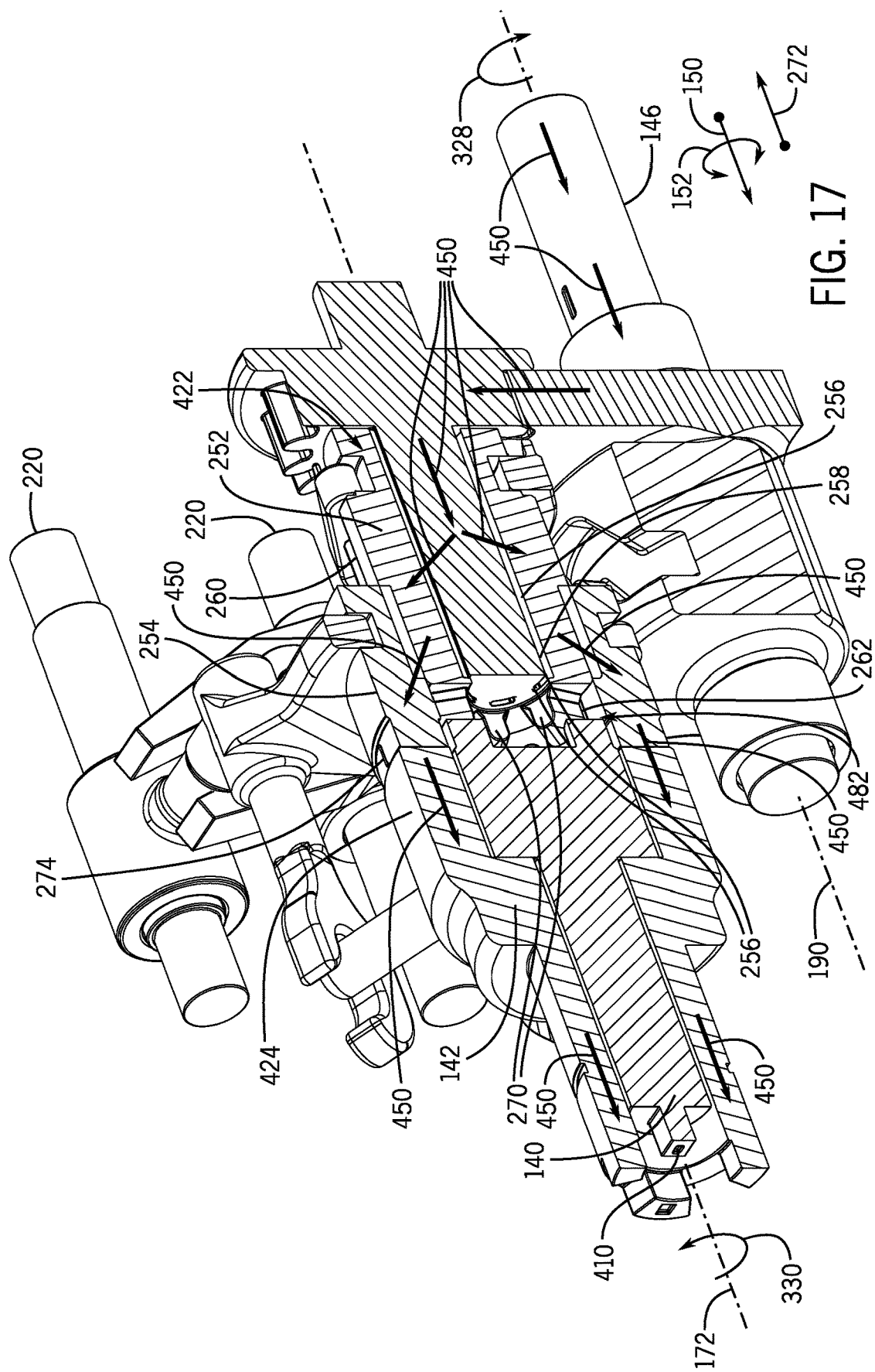
FIG. 17 is a cross-sectional, perspective view of an embodiment of the gearing assembly, in accordance with an aspect of the present disclosure.

The first input dog 252 further includes splines 260, which are disposed about a portion of the outer circumference of the first input dog 252. The splines 260 are configured to engage with internal grooves 262, as shown in FIG. 17, disposed about an inner circumference of the second input dog 254. Similar to the internal grooves 256 and the splines 258 discussed above, the internal grooves 262 and the splines 260 allow the second input dog 254 to slide axially relative to the first input dog 252, while still enabling the first input dog 252 to transfer rotational motion to the second input dog 254. Accordingly, the idler shaft 180 may rotate both the input dogs 186 while the first input dog 252 and the second input dog 254 may translate axially, independent of one another, relative to the idler shaft 180 via the actuation mechanism 188.

In some embodiments, an exterior surface 268 of the first output dog 140 is smooth, such that the first output dog 140 may independently rotate within the second output dog 142. The first output dog 140 and the second output dog 142 include a first holding stud 264 and a second holding stud 266, respectively, which protrude radially from the first and second output dogs 140, 142. A slot 269 disposed within a portion of the second output dog 142 enables the first holding stud 264 to radially protrude through the second output dog 142 while the first output dog 140 rotates within the second output dog 142.

The first input dog 252 and the first output dog 140 each include a first set of axially protruding teeth 270. As discussed in greater detail herein, axial movement of the first input dog 252 in a lateral direction 271 along the axis 150 may enable the first set of axially protruding teeth 270 to engage with one another, such that the first input dog 252 may transmit rotational motion to the first output dog 140. Conversely, axial movement of the first input dog 252 in a direction 272, opposite the direction 271 along the axis 150, may decouple the first set of axially protruding teeth 270 from one another, and thus, block the transmission of rotational motion from the first input dog 252 to the first output dog 140.

Similar to the first set of axially protruding teeth 270 of the first input dog 252 and the first output dog 140, the second input dog 254 and the second output dog 142 may include a second set of axially protruding teeth 274 that are configured to engage or disengage with one another. For example, axial movement of the second input dog 254 in the direction 271 may enable the second set of axially protruding teeth 274 to engage, such that the second input dog 254 may transmit rotational motion to the second output dog 142. Conversely, axial movement of the second input dog 254 in the direction 272 may decouple the second set of axially protruding teeth 274 from one another, and thus, block the transmission of rotational motion from the second input dog 254 to the second output dog 142. As such, axial translations of the first and second input dogs 252, 254 may enable the selective distribution rotational motion to be transferred from the idler shaft 180 to the first output dog 140, the second output dog 142, or both.

In some embodiments, the gearing assembly 156 is configured to rotate the first output dog 140 and the second output dog 142 about the first centerline 172 between a mutual first position and a mutual second position. Specifically, the gearing assembly 156 is configured to transition the first output dog 140 from the first position to the second position, while the second output dog 142 is held substantially stationary in the first position. After the first output dog 140 has transitioned to the second position, the gearing assembly 156 transitions the second output dog 142 from the first position to the second position, while now holding the first output dog 140 substantially stationary in the second position. The gearing assembly 156 is configured to return the first and second output dogs 140, 142 from the second position to the first position in the reverse order discussed above. For example, the gearing assembly may transition the second output dog 142 from the second position to the first position, while the first output dog 140 is held substantially stationary in the second position. After the second output dog 142 has transitioned to the first position, the gearing assembly 156 transitions the first output dog 140 from the second position to the first position, while now holding the second output dog 142 substantially stationary in the first position.

Figure 6:
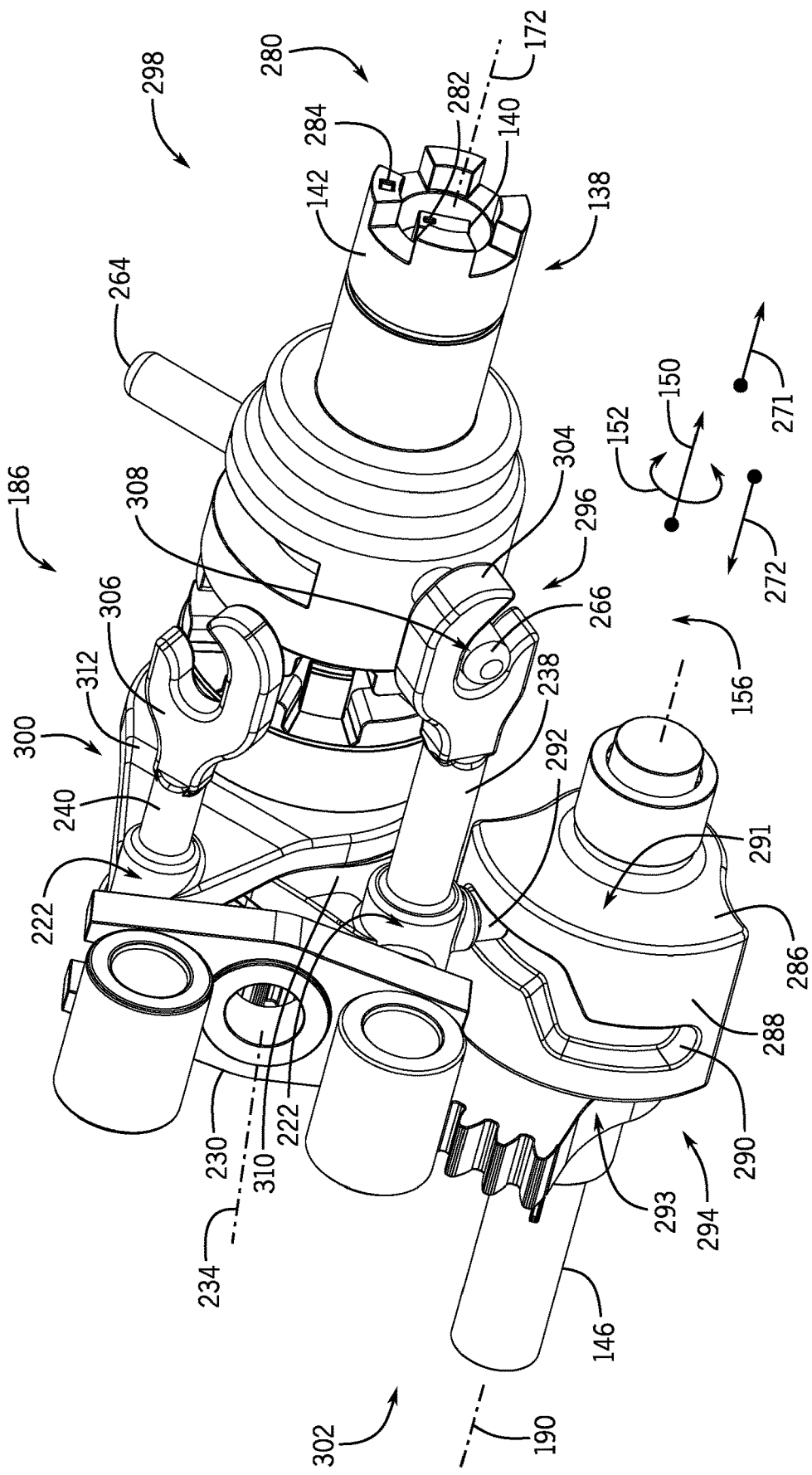
FIG. 6 is a perspective view of an embodiment of the gearing assembly, in accordance with an aspect of the present disclosure.

With the foregoing in mind, FIG. 6 is an embodiment of the gearing assembly 156 in which the first and second output dogs 140, 142 are each disposed in a first position 280, as indicated by a first marker 282 disposed on the first output dog 140 and a second marker 284 disposed on the second output dog 142 relative to one another. The gearing assembly 156 includes a cam gear 286 that is coupled to the input shaft 146. The cam gear 286 may include an external surface 288 having a contoured profile 290 disposed therein. The contoured profile 290 (or slot 290) may define a path that directs a tracing peg 292 of the first actuator 238 from a front portion 291 to a rear portion 293 of the cam gear 286. As discussed in greater detail herein, the tracing peg 292 is configured to follow the path defined by the contoured profile 290 during rotation of the cam gear 286, such that rotational motion of the cam gear 286 forces axial movement of the tracing peg 292 along the lateral axis 150. Accordingly, the tracing peg 292 axially translates the first actuator 238 in the lateral direction 272 or the direction 272 during rotation of the cam gear 286.

In the illustrated embodiment of the gearing assembly 156, the cam gear 286 is disposed in a first position 294, such that the tracing peg 292 maintains the first actuator 238 in an extended position 296. In other words, because the contoured profile 290, and thus the tracing peg 292, is proximate the front portion 291 of the cam gear 286 while the cam gear 286 is disposed in the first position 294, the tracing peg 292 directs or maintains the first actuator 238 in a position proximate a frontward portion 298 of the gearing assembly 156. The reversing member 230 maintains the second actuator 240 in a retracted position 300, which directs or maintains the second actuator 240 in a position proximate a rearward portion 302 of the gearing assembly 156.

The first and second actuators 238, 240 include a first receiver 304 and a second receiver 306, respectively. The first receiver 304 is configured to engage with the second holding stud 266 while the second receiver 306 is configured to engage with the first holding stud 264. For example, when the first actuator 238 is disposed in the extended position 296, the first receiver 304 engages with the second holding stud 266 coupled to the second output dog 142. Specifically, the second holding stud 266 is disposed within a groove 308 of the first receiver 304, such that the second holding stud 266, and thus the second output dog 142, are substantially restricted from rotational motion about the first centerline 172.

Figure 7:
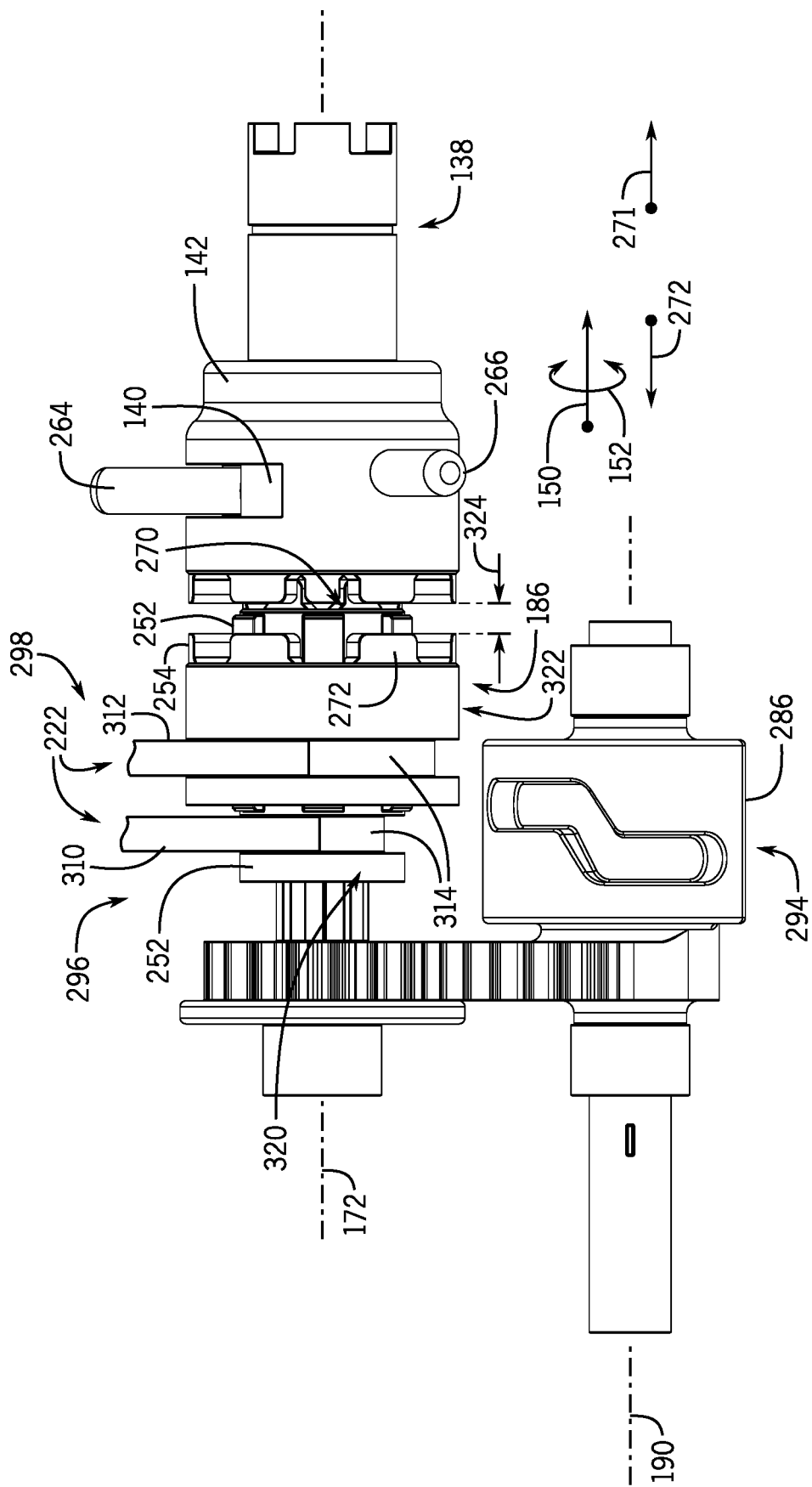
FIG. 7 is an elevation view of an embodiment of the gearing assembly, in accordance with an aspect of the present disclosure.

The first and second actuators 238, 240 include a first translating member 310 and a second translating member 312, respectively, which enable the axial actuators 222 to engage with and axially translate the input dogs 186 along the input shaft 180. For example, as shown in FIG. 7, the first and second translating members 310, 312 engage with respective grooves 314 disposed about a circumference of each of the input dogs 186. The grooves 314 enable the first and second translating members 310, 312 to individually transfer axial movement from each of the axial actuators 222 to the input dogs 186, while still enabling the input dogs 186 to rotate about the first centerline 172, relative to the axial actuators 222. As discussed above, in embodiments where the cam gear 286 is disposed in the first position 294, the first actuator 238 is disposed in the extended position 296. Accordingly, the first translating member 310 maintains the first input dog 252 in an engaged position 320, such that the first set of axially protruding teeth 270 may couple the first input dog 252 to the first output dog 140. The reversing member 230 maintains the second actuator 240 in the retracted position 300, such that the second translating member 312 maintains the second input dog 254 in a disengaged position 322. As such, a gap 324 may form between the axially protruding teeth 274 of the second input dog 254 and the second output dog 142, such that the second input dog 254 is unable to transfer rotational motion to the second output dog 142.

Figure 8:
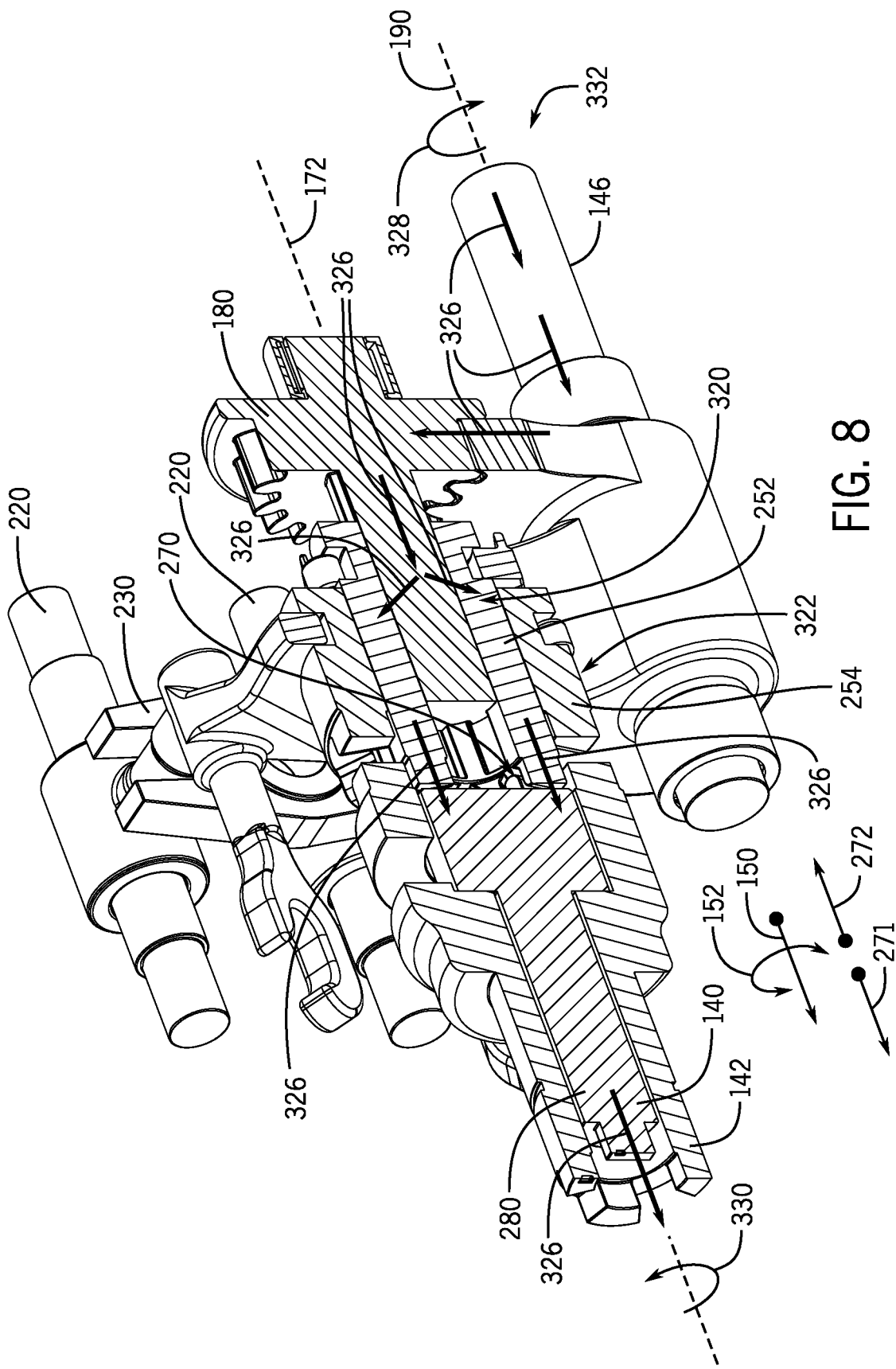
FIG. 8 is a cross-sectional, perspective view of an embodiment of the gearing assembly, in accordance with an aspect of the present disclosure.
Figure 18:
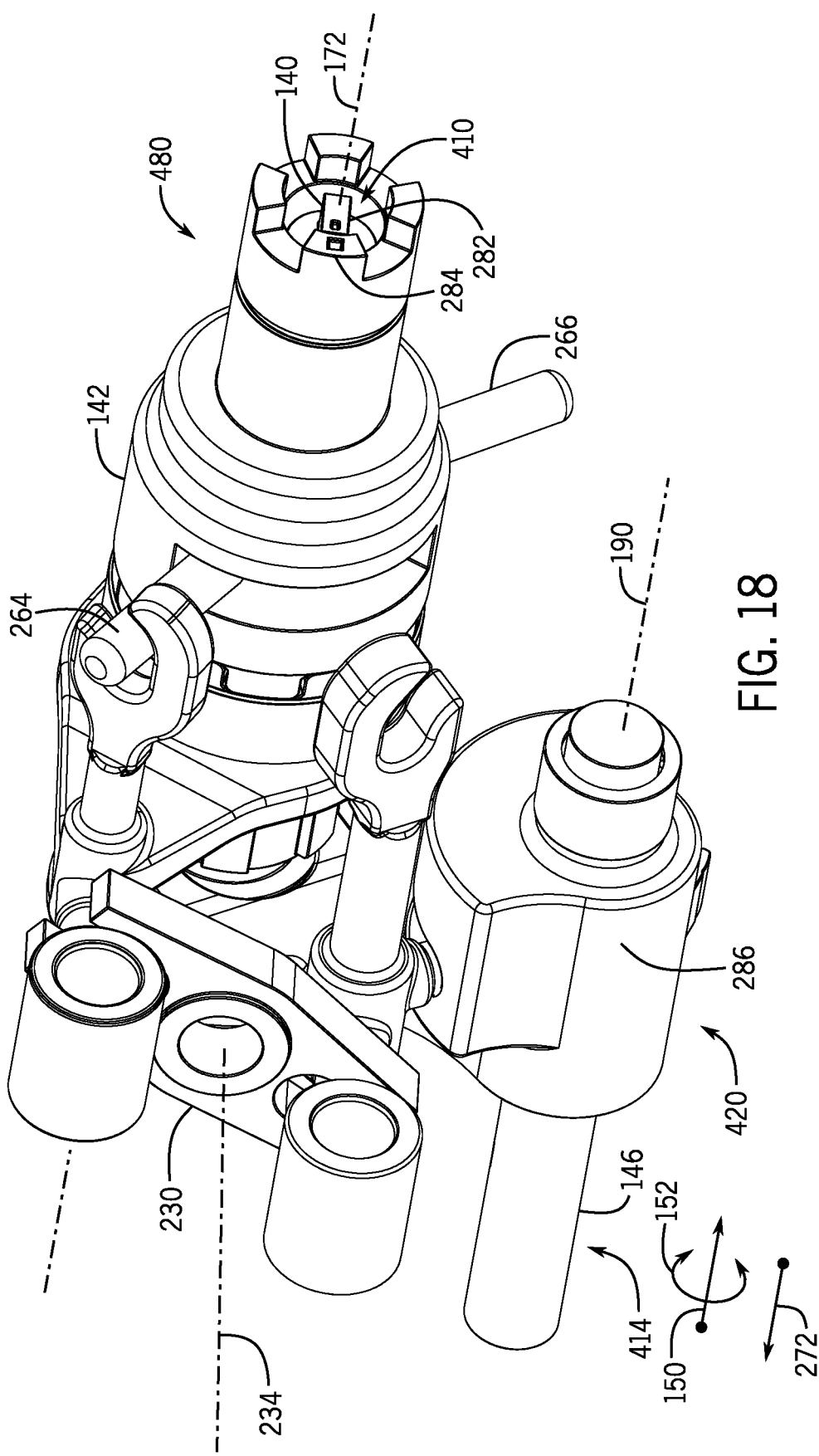
FIG. 18 is a perspective view of an embodiment of the gearing assembly, in accordance with an aspect of the present disclosure.

FIG. 8 is a cross-sectional view of the gearing assembly 156, which shows a flow path of mechanical energy, represented by arrows 326, associated with rotating the first output dog 140 from the first position 280 to a second position, as shown in FIG. 18. In the illustrated embodiment, the input shaft 146 rotates clockwise about the second centerline 190, as shown by arrow 328, starting from a first position 332. Clockwise rotation of the input shaft 146 induces counter-clockwise rotation of the idler shaft 180, as shown by arrow 330. The idler shaft 180 transfers this rotational motion to the first input dog 252, and thus, the first output dog 140. Accordingly, the first output dog 140 may rotate counter-clockwise about the first centerline 172, as shown by arrow 330. As noted above, the second output dog 142 may remain stationary in the first position 280 prior to the first output dog 140 reaching the second position.

Figure 9:
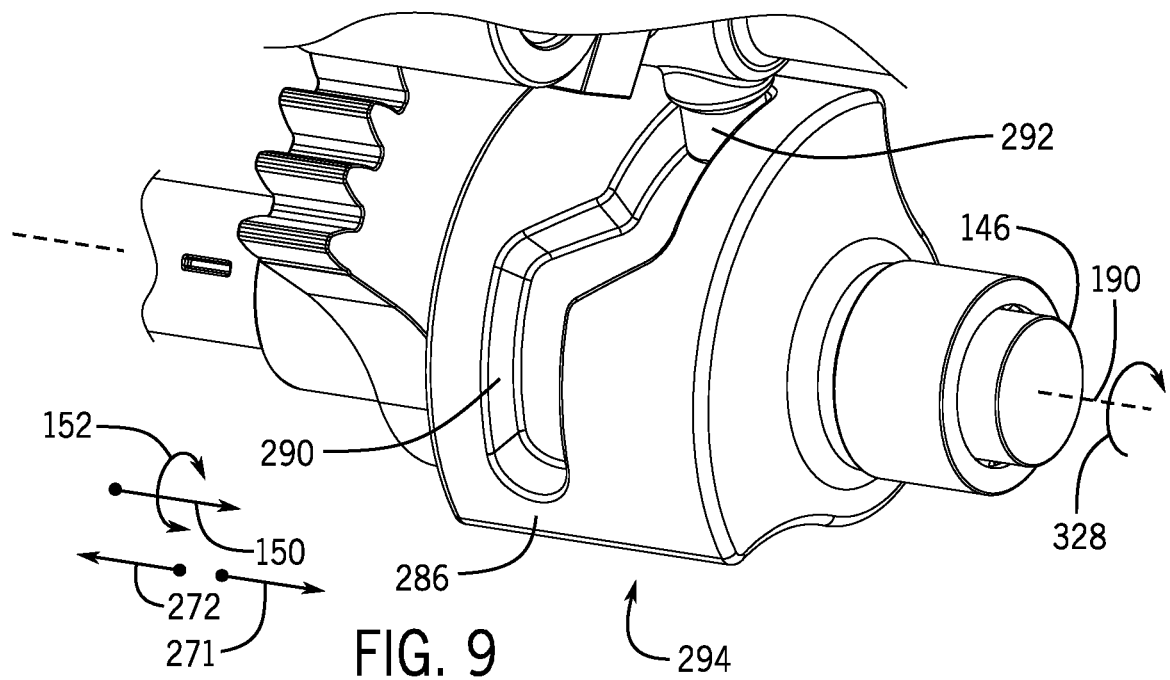
FIG. 9 is a perspective view of an embodiment of a cam included in the gearing assembly, in accordance with an aspect of the present disclosure.
Figure 10:
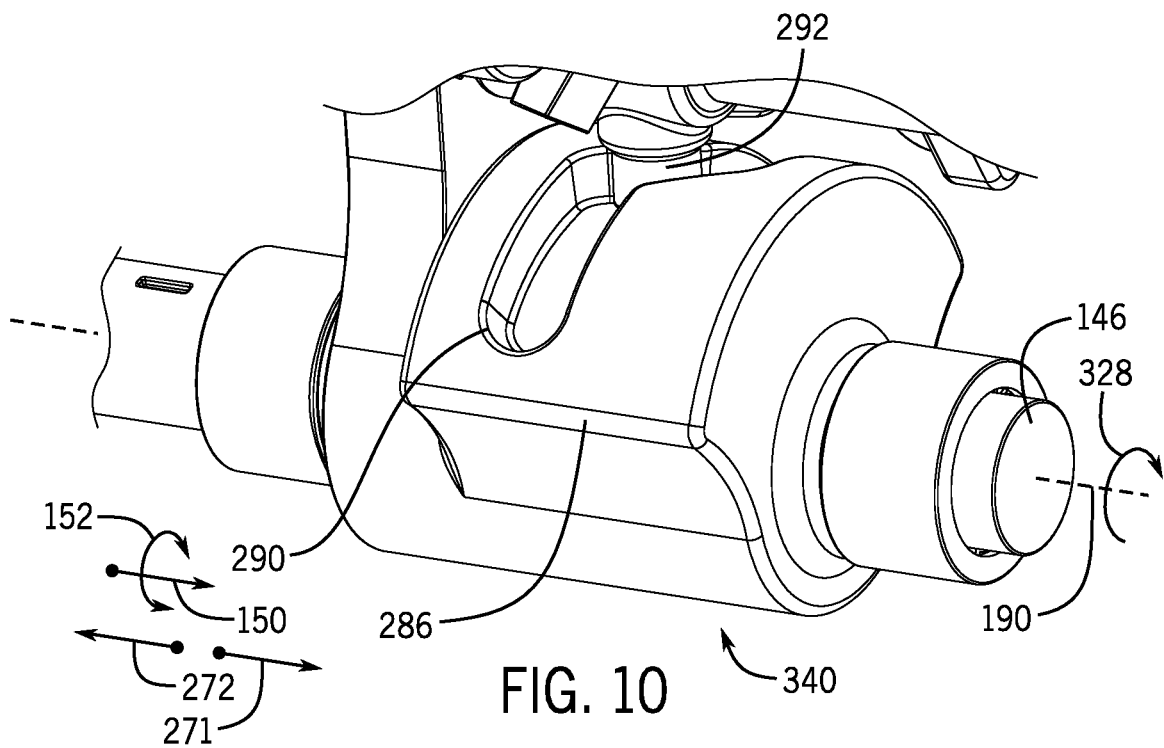
FIG. 10 is a perspective view of an embodiment of the cam, in accordance with an aspect of the present disclosure.
Figure 11:
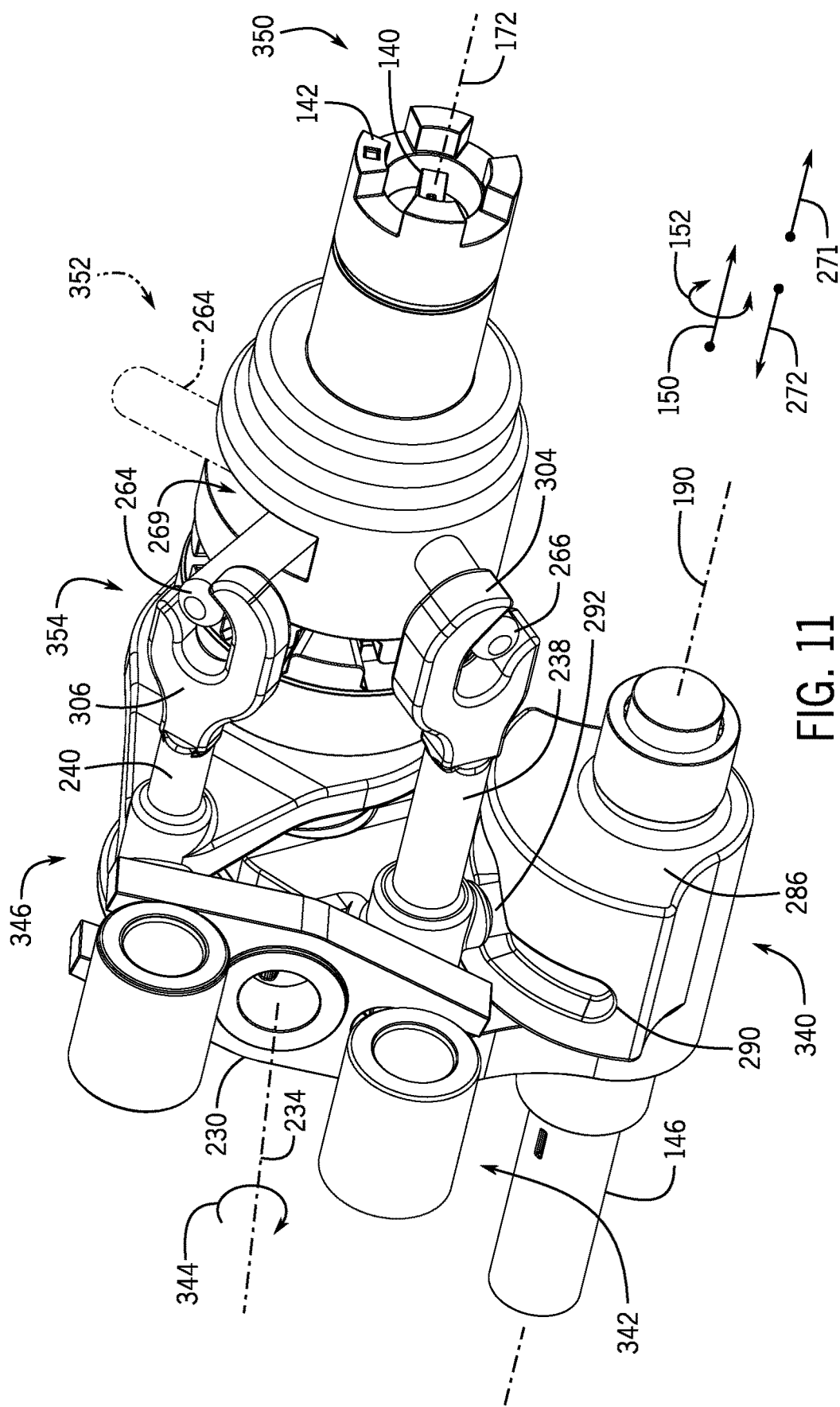
FIG. 11 is a perspective view of an embodiment of the gearing assembly, in accordance with an aspect of the present disclosure.

The clockwise rotation of the input shaft 146 transitions the cam gear 286 from the first position 294, as shown in FIG. 9, to an intermediate position 340, as shown in FIG. 10. The tracing peg 292 of the first actuator 238 follows the path defined by the contoured profile 290 of the cam gear 286, which directs movement of the first actuator 238 in the direction 272. Accordingly, the first actuator 238 may move from the extended position 296 toward a respective first intermediate position 342, as shown in FIG. 11. As described in greater detail herein, the translational movement of the first actuator 238 in the direction 272 may enable the first receiver 304 to partially disengage from the second holding stud 266. The translational movement of the first actuator 238 along the direction 272 also causes clockwise rotation of the reversing member 230 about the third centerline 234, as shown by arrow 344. This rotational motion of the reversing member 230 may direct the second actuator 240 to translate axially in the direction 271, and thus, move from the retracted position 300 to a respective second intermediate position 346.

The rotational motion of the input shaft 146 may transition the first output dog 140 from the first position 280 to an intermediate position 350. Accordingly, the first holding stud 264 of the first output dog 140 may rotate from a respective first position 352 to a respective second position 354, in which the first holding stud 264 is partially received by the second receiver 306. As noted above, the slot 269 may enable the first holding stud 264 to rotate about the first centerline 172 even though the first holding stud 264 radially protrudes through the stationary second output dog 142.

Figure 12:
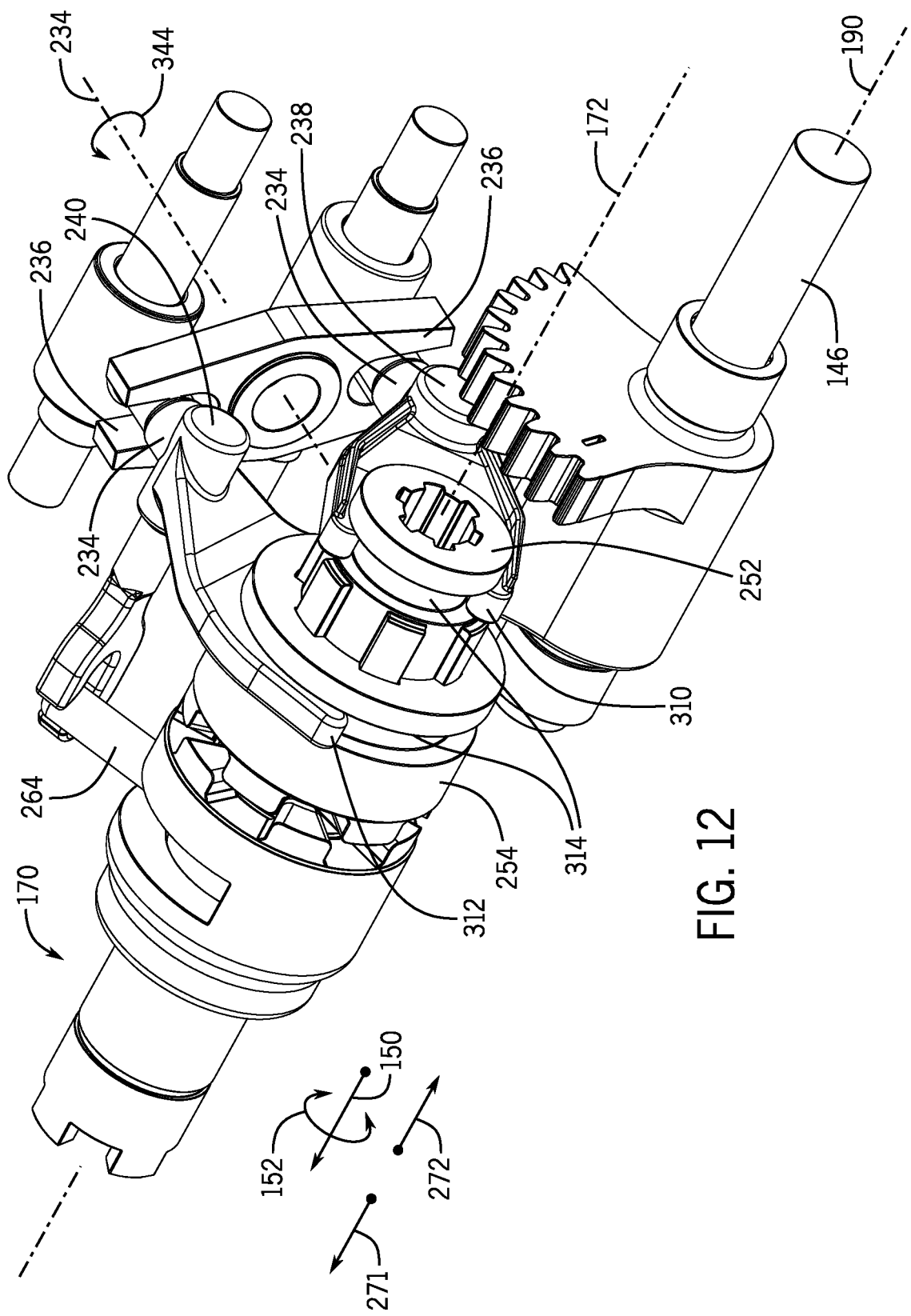
FIG. 12 is a perspective view of an embodiment of the gearing assembly, in accordance with an aspect of the present disclosure.
Figure 13:
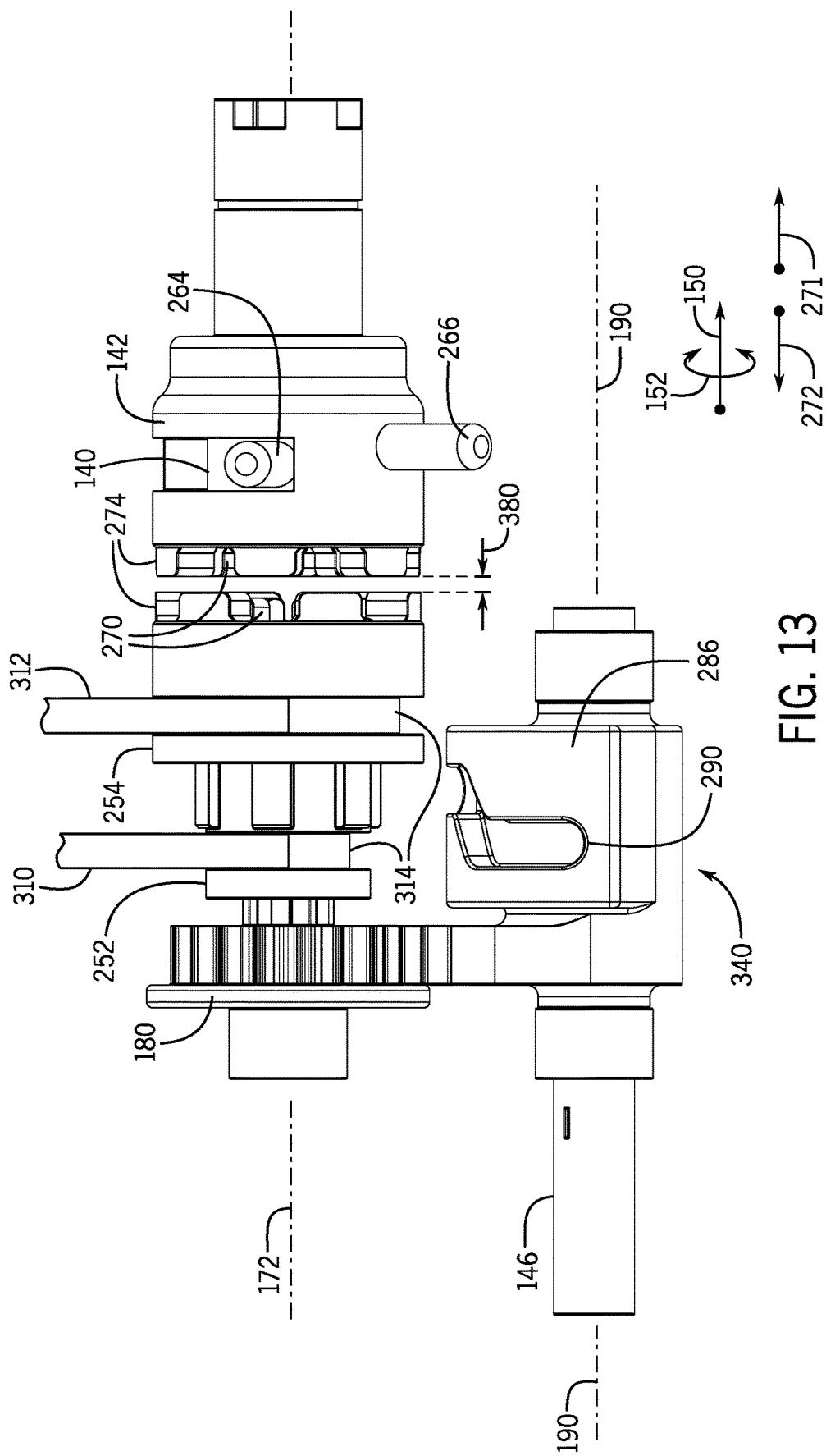
FIG. 13 is an elevation view of an embodiment of the gearing assembly, in accordance with an aspect of the present disclosure.

Continuing to FIG. 12, the first translating member 310 of the first actuator 238 axially translates the first input dog 252 in the direction 272. Conversely, the second translating member 312 of the second actuator 240 axially translates the second input dog 254 along the direction 271. As shown in FIG. 13, in some embodiments, these translations may form a gap 380 extending between both the first set of axially protruding teeth 270 of the first input dog 252 and the first output dog 140 and the second set of axially protruding teeth 274 of the second input dog 254 and the second output dog 142. The gap 380 may form during a predetermined operational time period of the gearing assembly 156, referred to herein as a transitioning phase. For example, the transitioning phase may be indicative of an operational time period of the gearing assembly 156 during which the first translating member 310 has disengaged the first input dog 252 from the first output dog 140, while the second translating member 312 has not yet engaged the second input dog 254 with the second output dog 142. In other words, both the first set of axially protruding teeth 270 and the second set of axially protruding teeth 274 may each be disengaged from one another during the transitioning phase of the gearing assembly 156.

In some embodiments, the transitioning phase may occur while the actuator 144 rotates the input shaft 146 between an initiating angular position and a terminating angular position, which are between the first position 332, as shown in FIG. 8, and a second position 414, as shown in FIG. 18, of the input shaft 146. The initiating angular position may be indicative of a degree of rotation of the input shaft 146 from the first position 332 at which the first input dog 252 has disengaged from the first output dog 140, but the second input dog 254 has not yet engaged with the second output dog 142. The terminating angular position may be indicative of the degree of rotation of the input shaft 146 from the first position 332 at which the second input dog 254 initiates engagement with the second output dog 142.

As a non-limiting example, the initiating angular position of the input shaft 146 may be approximately thirty eight degrees of rotation from the first position 332, while the concluding angular position of the input shaft 146 may be approximately fifty two degrees of rotation from the first position 332. Accordingly, the gap 380 may be disposed between the input dogs 186 and the output dogs 138 while the input shaft 146 rotates between thirty eight to fifty two degrees of rotation from the first position 332 toward the second position 414. The transitioning phase is thus indicative of an operational time period of the gearing assembly 156 during which rotational motion of the input shaft 146 is not transferred to either of the output dogs 138 via the input dogs 186. Instead, as discussed in greater detail herein, the rotational motion of the input shaft 146 is transferred to an appropriate one of the output dogs 138 through engagement between the first and second receivers 304, 306 and the second and first holdings studs 266, 264, respectively.

Figure 14:
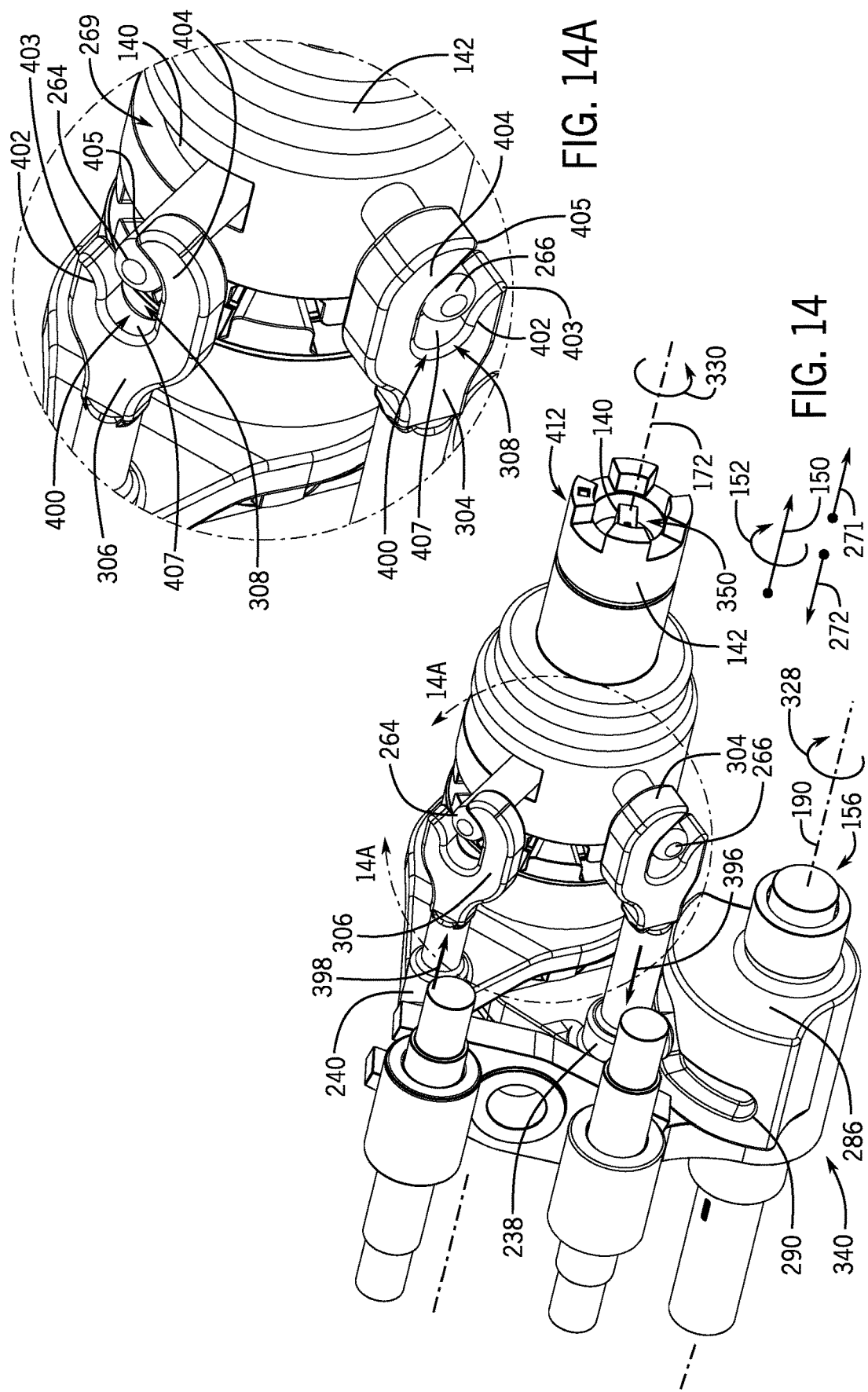
FIG. 14 is a perspective view of an embodiment of the gearing assembly, in accordance with an aspect of the present disclosure.
Figure 16:
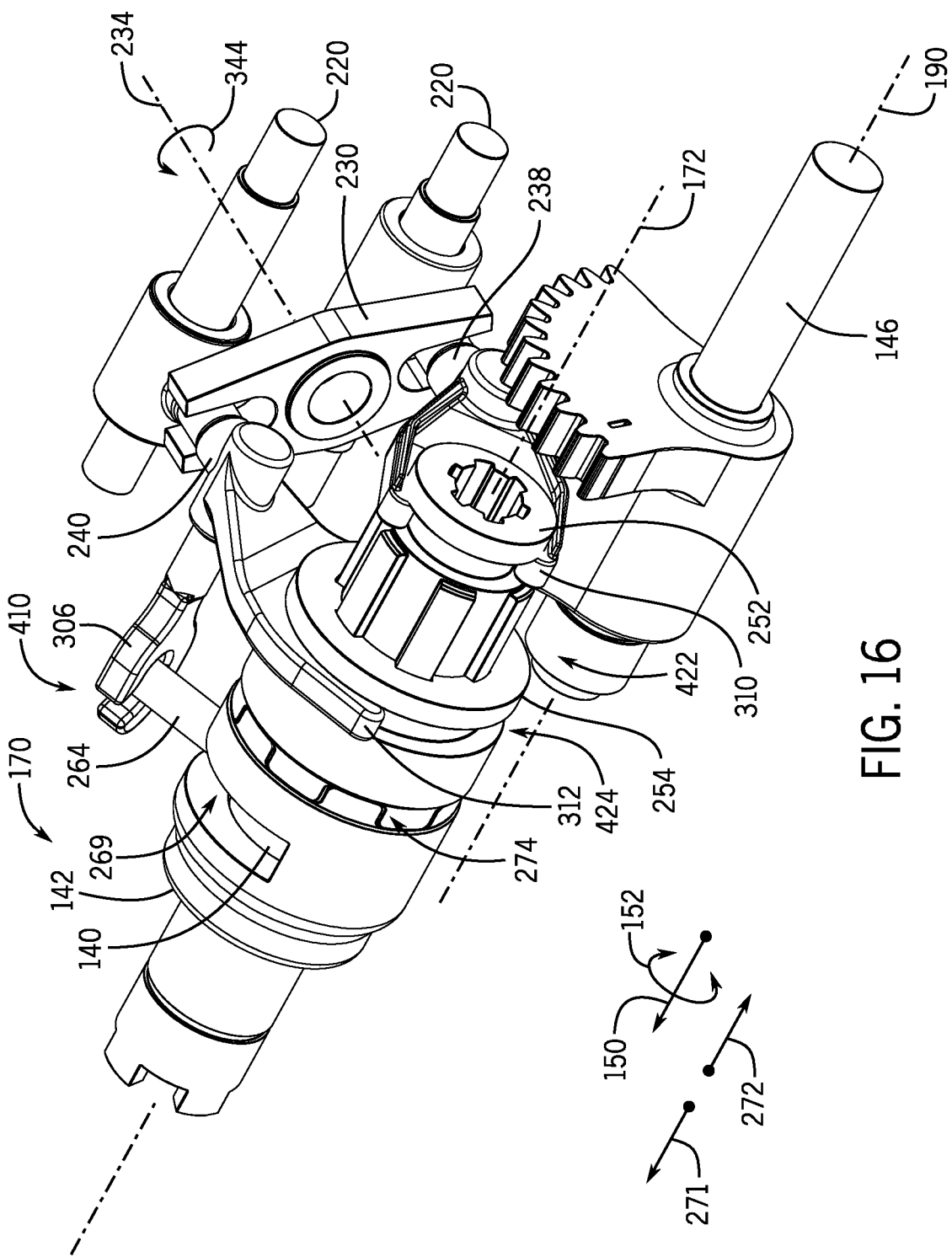
FIG. 16 is a perspective view of an embodiment of the gearing assembly, in accordance with an aspect of the present disclosure.

FIGS. 14 and 14A show an embodiment of the gearing assembly 156 in the transitioning phase, and will be referred to concurrently throughout the following discussion. The first receiver 304 moves in the direction 272 with the first actuator 238, as indicated by arrow 396, while the second receiver 306 moves in the direction 271 with the second actuator 240, as indicated by arrow 398. The first and second receivers 304, 306 each include an internal surface 400, which defines a perimeter of the grooves 308. The internal surfaces 400 each define a receiving curve 402 having an engagement tip 403, and a releasing curve 404 having a disengagement tip 405. The receiving curve 402 of the second receiver 306 is configured to contact the first holding stud 264 while the second receiver 306 extends in the direction 271. Accordingly, the internal surface 400 of second receiver 306 guides the first holding stud 264 along the receiving curve 402 from the engagement tip 403 to a trough 407 of the second receiver 306, which directs counter-clockwise rotation of the first holding stud 264 about the first centerline 172, as shown by the arrow 330. Thus, the second receiver 306 may transition the first output dog 140 from the intermediate position 350 to a second position 410, as show in FIG. 16. In some embodiments, a degree of rotation between the first position 280, as shown in FIG. 6, of the first output dog 140 and the second position 410 of the first output dog 140 may be approximately ninety degrees. However, in other embodiments, the degree of rotation between the first and second positions 280, 410 of the first output dog 140 may be forty five degrees, 180 degrees, 270 degrees, or any other suitable angle of rotation. In any case, the second receiver 306 facilitates transitioning the first output dog 140 to the appropriate second position 410.

Similar to the discussion above, the first receiver 304 may initiate rotational motion of the second output dog 142 during the transitioning phase of the gearing assembly 156. For example, while the first receiver 304 translates axially in the direction 272, the holding stud 266 is directed along the internal surface 400 from the trough 407 of the first receiver 304 toward the disengagement tip 405 of the first receiver 304. Accordingly, the second holding stud 266 is directed along the releasing curve 404, which initiates counter-clockwise rotational motion of the second holding stud 266 about the first centerline 172, as shown by the arrow 330. In some embodiments, the first receiver 304 may thus align the second set of axially protruding teeth 274 with one another before the second input dog 254 engages with the second output dog 142. Accordingly, the first receiver 304 causes the second output dog 142 to transition from the first position 280, as shown in FIG. 6, to an intermediate position 412.

Figure 15:
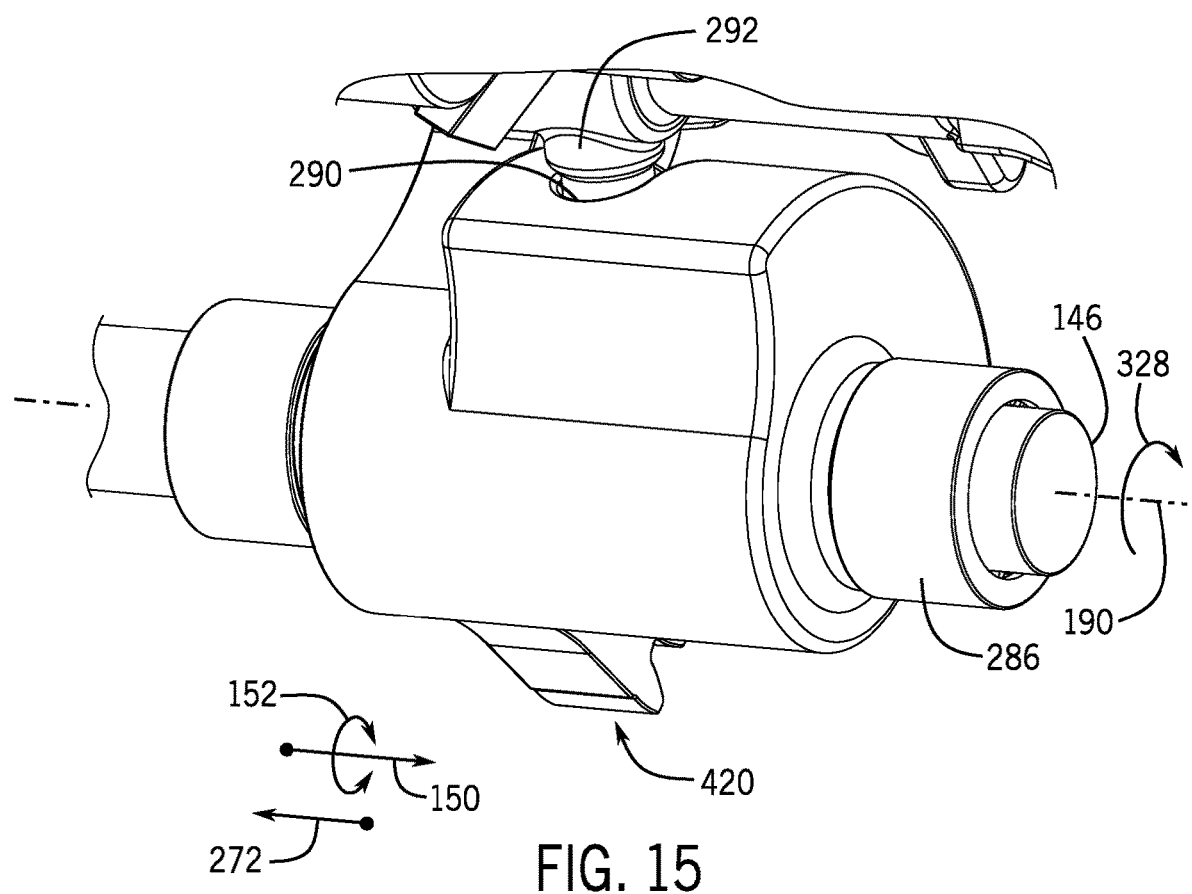
FIG. 15 is a perspective view of an embodiment of the cam, in accordance with an aspect of the present disclosure.

Further clockwise rotation, as shown by the arrow 328, of the input shaft 146 about the second centerline 190 enables the cam gear 286 to transition from the intermediate position 340, as shown in FIG. 10, to a second position 420, as shown in FIG. 15. Accordingly, the contoured profile 290 further translates the tracing peg 292, and thus the first actuator 238, in the direction 272. As shown in the embodiment of the gearing assembly 156 of FIG. 16, this axial translation will enable the first translating member 310 to move the first input dog 252 to a fully disengaged position 422. The reversing member 230 translates the second actuator 240 in the direction 271, such that the second translating member 312 may cause the second set of axially protruding teeth 270 between the second input dog 254 and the second output dog 142 to engage. Accordingly, the second input dog 254 transitions from the intermediate position 412 to a fully engaged position 424. The second receiver 306 engages with the first holding stud 264, such that the first holding stud 264 blocks rotational motion of the first output dog 140 about the first centerline 172. As noted above, the slot 269 enables the second output dog 142 to rotate relative to the stationary first holding stud 264 of the first output dog 140.

FIG. 17 is a cross-sectional view of the gearing assembly 156, which shows a flow path of mechanical energy, as represented by arrows 450, associated with rotating the second output dog 142 from the first position 280, as shown in FIG. 6, to a second position 480, as shown in FIG. 18. In the illustrated embodiment, the input shaft 146 rotates clockwise about the second centerline 190, as shown by the arrow 328. Clockwise rotation of the input shaft 146 causes counter-clockwise rotation of the idler shaft 180. Rotational motion is transferred from the idler shaft 180 to the first input dog 252 through the engagement between the splines 258 of the idler shaft 180 and the internal grooves 256 of the first input dog 252. Engagement between the splines 260 of the first input dog 252 and the internal grooves 262 of the second input dog 254 similarly transfers rotational motion from the first input dog 252 to the second input dog 254. Finally, the second set of axially protruding teeth 274 transfer the rotational motion from the second input dog 254 to the second output dog 142.

It is important to note that even though the first input dog 252 may rotate about the first centerline 172 with the second input dog 254, the first input dog 252 does not rotate the first output dog 140 because of a gap 482 that is disposed between the first set of axially protruding teeth 270 while the first input dog 252 is disposed in the fully disengaged position 422.

FIG. 18 is a perspective view of the gearing assembly 156 in which the second output dog 142 has transitioned to the second position 480 after the actuator 144 rotates the input shaft 146 in the second position 414. In some embodiments, the second position 414 of the input shaft 146 may be approximately 180 degrees of rotation from the first position 332. However, in other embodiments, the degree of angular rotation between the first and second positions 332, 414 of the input shaft 146 may include any other suitable increment. In some embodiments, the first marker 282 of the first output dog 140 may be aligned with the second marker 284 of the second output dog 142 when the first and second output dogs 140, 142 are each in their respective second positions 410, 480. In other words, the angular position of the first and second output dogs 140, 142 may be substantially similar while the first and second output dogs 140, 142 are disposed in their respective second positions 410, 480. The rotational difference between the first position 280 of the first and second output dogs 140, 142 and their respective second positions 410, 480 may be approximately 90 degrees. However, in other embodiments, this rotational difference may be approximately sixty degrees, 120 degrees, 180 degrees, or any other suitable angular increment.

In some embodiments, the gearing assembly 156 may transition the first and second output dogs 140, 142 from the respective second position 410, 480 to the first position 280 in the reverse order as discussed above. For example, the gearing assembly may first transition the second output dog 142 from the second position 480 to the first position 280. Subsequent to this transition, the gearing assembly 156 may initiate rotational motion of the first output dog 140, such that the first output dog 140 may similarly transition from the respective second position 410 to the first position 280.

Technical effects of the gearbox mechanism 100 include enabling a single actuator, such as the actuator 144, to individually control a position of each shaft of a concentric pair of shafts. Accordingly, the gearbox mechanism 100 may enable a single actuator to control, for example, a split-blade damper, such as the flow modulation device 102. The gearbox mechanism 100 may thus facilitate operation of the flow modulation device 102, because synchronization of multiple actuators may not be performed. This may reduce assembly time and/or assembly costs of the flow modulation device 102, or any suitable device utilizing the gearbox mechanism 100. Additionally, the gearbox mechanism 100 may facilitate maintenance of the flow modulation device 102, as multiple actuators need not be inspected or serviced.

As discussed above, the aforementioned embodiments of the gearbox mechanism 100 may be used on the HVAC unit 12, a residential heating and cooling system, a rooftop unit, or in any other suitable HVAC system. For example, the first and second output dogs 140, 142 of the gearbox mechanism 100 may be used to individually modulate a position of the first blade 108 and the second blade 110 of the flow modulation device 102 discussed above. However it should be noted that the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A power transmission system for actuating a damper, comprising:
    an input shaft configured to rotate about a first axis;
    a first input dog comprising a first arrangement of teeth extending along a second axis parallel to the first axis, wherein the first input dog is rotatably coupled to the input shaft such that rotation of the input shaft imparts rotation to the first input dog about the second axis; and
    a second input dog comprising a second arrangement of teeth extending along the second axis, wherein the second input dog is coupled to the first input dog such that rotation of the first input dog imparts rotation to the second input dog about the second axis, wherein the first arrangement of teeth is positioned concentrically inward relative to the second arrangement of teeth, wherein the first input dog and the second input dog are configured to move axially along the second axis relative to one another to enable independent engagement and disengagement of the first and second input dogs with first and second output dogs, respectively, and wherein the first and second output dogs are configured to engage with respective damper blades of the damper.

2. The power transmission system of claim 1, wherein the first output dog is coupled to a first damper blade of the damper blades, and the second output dog is coupled to a second damper blade of the damper blades.

3. The power transmission system of claim 2, wherein the first and second damper blades are concentric with one another.

4. The power transmission system of claim 1, comprising an idler shaft extending through the first and second input dogs and rotatably coupling the first and second input dogs to the input shaft, wherein a first arrangement of splines coupled to the idler shaft extends along the second axis and engages with a first arrangement of grooves disposed within the first input dog, and wherein a second arrangement of splines coupled to the first input dog extends parallel to the first arrangement of splines and engages with a second arrangement of grooves disposed within the second input dog.

5. The power transmission system of claim 1, further comprising:
    a pair of axial actuators each configured to engage with and axially translate a respective one of the first and second input dogs along the second axis; and
    a reversing member coupled to the pair of axial actuators and extending between the pair of axial actuators, wherein the reversing member is configured to rotate about a third axis, wherein the reversing member is configured to translate a first axial actuator of the pair of axial actuators in a first direction and translate a second axial actuator of the pair of axial actuators in a second direction, opposite the first direction.

6. The power transmission system of claim 5, wherein the first axial actuator axially translates between a first extended position and a first retracted position of the first axial actuator, wherein the first axial actuator is configured to block rotation of the second output dog in the first extended position of the first axial actuator.

7. The power transmission system of claim 6, wherein the second axial actuator axially translates between a second extended position and a second retracted position of the second axial actuator, wherein the second axial actuator is configured to block rotation of the first output dog in the second extended position of the second axial actuator.

8. The power transmission system of claim 1, comprising an actuator coupled to the input shaft and configured to rotate the input shaft, wherein the power transmission system is configured such that a first degree of rotation of the input shaft causes a second degree of rotation of the first and second input dogs, and wherein the first and second degrees of rotation are different.

9. The power transmission system of claim 1, wherein the first and second output dogs comprise a first holding stud and a second holding stud, respectively, and wherein the first and second holding studs each radially extend from the second axis.

10. The power transmission system of claim 9, wherein the first holding stud protrudes through a slot extending partially about a circumference of the second output dog.

11. A power transmission system for actuating a damper, comprising:
    an input shaft configured to rotate about a first axis;
    an idler shaft rotatably coupled to the input shaft such that rotation of the input shaft imparts rotation to the idler shaft, wherein the idler shaft extends along and is configured to rotate about a second axis;
    a first input dog disposed concentrically within a second input dog, wherein the first and second input dogs are coupled to the idler shaft, configured to rotate with the idler shaft and configured to move axially along the second axis relative to the idler shaft and each other; and
    a first output dog disposed concentrically within a second output dog, wherein the first and second output dogs are configured to rotate about the second axis and respectively engage with first and second damper blades of the damper, and wherein axial movement of the first input dog relative to the idler shaft enables engagement and disengagement between the first input dog and the first output dog.

12. The power transmission system of claim 11, wherein axial movement of the second input dog relative to the idler shaft enables engagement and disengagement between the second input dog and the second output dog.

13. The power transmission system of claim 11, wherein the first output dog is coupled to the first damper blade and the second output dog is coupled to the second damper blade, wherein the first and second damper blades are concentric with one another.

14. The power transmission system of claim 11, wherein the input shaft comprises an input gear configured to engage with an idler gear of the idler shaft such that rotation of the input gear imparts rotation to the idler gear.

15. The power transmission system of claim 14, wherein at least one of the input gear and the idler gear comprises a partial gear.

16. The power transmission system of claim 14, wherein a gear ratio between the input gear and the idler gear is 1:2, 1:3, or 1:4.

17. The power transmission system of claim 11, comprising an axial actuation mechanism disposed adjacent to the first and second input dogs, wherein the axial actuation mechanism comprises:
    a first axial actuator configured to engage with and axially translate the first input dog;
    a second axial actuator configured to engage with and axially translate the second input dog; and a reversing member coupled to the first and second axial actuators and extending between the first and second axial actuators, wherein the reversing member is configured to rotate about a third axis to transfer axial movement between the first and second axial actuators.

18. The power transmission system of claim 17, wherein a cam gear coupled to the input shaft is configured to engage with a portion of the first axial actuator, wherein rotation of the cam gear in a first rotational direction axially translates the first axial actuator in a first direction parallel to the first axis, and wherein the reversing member is configured to axially translate the second axial actuator along a second direction, opposite to the first direction as the first axial actuator moves in the first direction.

19. The power transmission system of claim 18, wherein axial translation of the first axial actuator in the first direction disengages the first input dog from the first output dog and axial translation of the second axial actuator in the second direction engages the second input dog with the second output dog.

20. The power transmission system of claim 18, wherein the cam gear comprises a contoured profile configured to engage with a tracing peg of the first axial actuator such that rotation of the cam gear enables the contoured profile to impart axial movement to the first axial actuator.

21. The power transmission system of claim 11, wherein the first and second output dogs are coupled to an enclosure of the power transmission system and configured to rotate with respect to the enclosure, wherein the enclosure blocks axial movement of the first and second output dogs relative to the second axis.

22. A heating, ventilation, and/or air conditioning (HVAC) system, comprising:
a flow modulation device comprising a pair of concentric damper blades, wherein each damper blade of the pair of concentric damper blades is coupled to a respective one of a pair of concentric shafts configured to rotate about a first axis;
a power transmission system comprising first and second output dogs extending along the first axis, wherein the first and second output dogs are respectively coupled to a shaft of the pair of concentric shafts; and
an actuator coupled to and configured to rotate an input shaft of the power transmission system about a second axis, wherein the input shaft engages with first and second input dogs configured to rotate about the first axis such that rotation of the input shaft about the second axis imparts rotation to the first and second input dogs about the first axis, wherein the first and second input dogs are configured to translate axially along the first axis, and wherein axial translation of the first input dog enables engagement between the first input dog and the first output dog to enable the first input dog to induce rotational motion of the first output dog with respect to the second output dog.

23. The HVAC system of claim 22, wherein axial translation of the second input dog enables engagement between the second input dog and the second output dog to enable the second input dog to induce rotational motion of the second output dog with respect to the first output dog.

24. The HVAC system of claim 22, further comprising an idler shaft extending through the first and second input dogs and configured to rotate about the first axis, wherein a first arrangement of splines couples the first input dog to the idler shaft and a second arrangement of splines couples the first input dog to the second input dog such that rotation of the idler shaft imparts rotation to the first input dog and rotation of the first input dog imparts rotation to the second input dog.

25. The HVAC system of claim 24, wherein axial movement of the first and second input dogs relative to the idler shaft selectively couples or selectively decouples the first and second input dogs from the first and second output dogs, respectively.

26. The HVAC system of claim 22, wherein the first and second output dogs are configured to rotate between respective first positions and respective second positions, wherein the second output dog is configured to remain substantially stationary in the respective first position of the second output dog as the first output dog rotates from the respective first position of the first output dog to the respective second position of the first output dog.

27. The HVAC system of claim 26, wherein the first output dog is configured to remain substantially stationary in the respective second position of the first output dog as the second output dog rotates from the respective first position of the second output dog to the respective second position of the second output dog.

28. The HVAC system of claim 27, wherein a degree of rotation between the respective first positions of the first and second output dogs and the respective second positions of the first and second output dogs is 90 degrees.

29. The HVAC system of claim 22, comprising an input gear coupled to the input shaft and an idler gear coupled to an idler shaft, wherein the input gear is configured to engage with the idler gear such that rotation of the input gear imparts rotation to the idler gear, and wherein a gear ratio between the input gear and the idler gear is 1:2, 1:3, or 1:4.

30. The HVAC system of claim 22, wherein the power transmission system comprises an axial actuation mechanism configured to engage with a cam gear of the input shaft, wherein the axial actuation mechanism is configured to axially translate the first and second input dogs in response to rotational motion of the input shaft.

* * * * *